(12) United States Patent
Kawashima et al.

(10) Patent No.: US 12,224,678 B2
(45) Date of Patent: Feb. 11, 2025

(54) POWER CONVERTER AND HEAT PUMP SYSTEM PROVIDED THEREWITH

(71) Applicant: DAIKIN INDUSTRIES, LTD., Osaka (JP)

(72) Inventors: Reiji Kawashima, Osaka (JP); Masaki Kono, Osaka (JP); Masahide Fujiwara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 154 days.

(21) Appl. No.: 18/126,892

(22) Filed: Mar. 27, 2023

(65) Prior Publication Data

US 2023/0246561 A1  Aug. 3, 2023

Related U.S. Application Data

(63) Continuation of application No. PCT/JP2021/035881, filed on Sep. 29, 2021.

(30) Foreign Application Priority Data

Sep. 29, 2020 (JP) ................................. 2020-163992

(51) Int. Cl.
  *H02M 5/458* (2006.01)
  *H02M 1/00* (2007.01)
  (Continued)

(52) U.S. Cl.
  CPC ....... *H02M 5/4585* (2013.01); *H02M 1/0009* (2021.05); *H02M 1/088* (2013.01);
  (Continued)

(58) Field of Classification Search
  CPC .. H02M 5/4585; H02M 1/0009; H02M 1/088; H02M 1/12; H02M 1/44;
  (Continued)

(56) References Cited

U.S. PATENT DOCUMENTS 9,948,200 B2 * 4/2018 Yamashita ............ H02M 5/458
2014/0146574 A1 5/2014 Worek
(Continued)

FOREIGN PATENT DOCUMENTS

CN 105340173 A 2/2016
JP 5058314 B2 10/2012
(Continued)

OTHER PUBLICATIONS

International Search Report of corresponding PCT Application No. PCT/JP2021/035881 dated Nov. 2, 2021.
(Continued)

*Primary Examiner* — David Luo
(74) *Attorney, Agent, or Firm* — Global IP Counselors, LLP

(57) ABSTRACT

A power converter includes a power conversion unit for a three-phase alternating current output from an alternating-current power source, and a current compensation unit that supplies a compensating current to the alternating-current power source. The current compensation unit includes a current compensation unit inverter including switching elements, a current compensation unit capacitor, a current compensation unit reactor, a compensation controller that obtains an output voltage command value, and a drive signal generator that generates a drive signal usable to drive the switching elements by a three-phase modulation method. The current compensation unit inverter supplies the compensating current to the alternating-current power source via the current compensation unit reactor. $Td \leq (34.00/fsw - 0.145)(1.55 - 0.055 \cdot Pmax)$, where fsw represents a carrier frequency employed for generation of the drive signal, Pmax represents a maximum input power of the power conversion unit, and Td represents a dead time for the drive signal.

20 Claims, 19 Drawing Sheets

(51) Int. Cl.
*H02M 1/088* (2006.01)
*H02M 1/12* (2006.01)
*H02M 1/44* (2007.01)
*H02M 7/219* (2006.01)
*H02P 27/06* (2006.01)

(52) U.S. Cl.
CPC .............. *H02M 1/12* (2013.01); *H02M 1/44* (2013.01); *H02M 7/219* (2013.01); *H02P 27/06* (2013.01)

(58) Field of Classification Search
CPC .......... H02M 7/219; H02M 1/14; H02M 1/38; H02M 1/4208; H02M 7/5387; H02P 27/06; H02P 2201/15; H02P 23/04; H02P 27/085; H02P 29/50; H02J 3/01
USPC ................................................. 318/504, 494
See application file for complete search history.

(56) References Cited

U.S. PATENT DOCUMENTS

2016/0111991 A1   4/2016   Hozuki et al.
2016/0226425 A1   8/2016   Kawashima

FOREIGN PATENT DOCUMENTS

JP   2015-92813 A    5/2015
JP   2016-116330 A   6/2016

OTHER PUBLICATIONS

European Search Report of corresponding EP Application No. 21 87 5701.1 dated Sep. 4, 2024.
International Preliminary Report of corresponding PCT Application No. PCT/JP2021/018533 dated Apr. 13, 2023.

* cited by examiner

| FREQUENCY (kHz) | THREE-PHASE MODULATION | TWO-PHASE MODULATION |
|---|---|---|
| 15 | 2.12 | 2.88 |
| 20 | 1.56 | 2.13 |
| 25 | 1.22 | 1.67 |
| 30 | 0.99 | 1.37 |
| 35 | 0.83 | 1.16 |
| 40 | 0.71 | 1.00 |
| 45 | 0.61 | 0.87 |
| 55 | 0.47 | 0.69 |
| 65 | 0.38 | 0.56 |
| 75 | 0.31 | 0.47 |
| 85 | 0.26 | 0.40 |
| 95 | 0.21 | 0.34 |

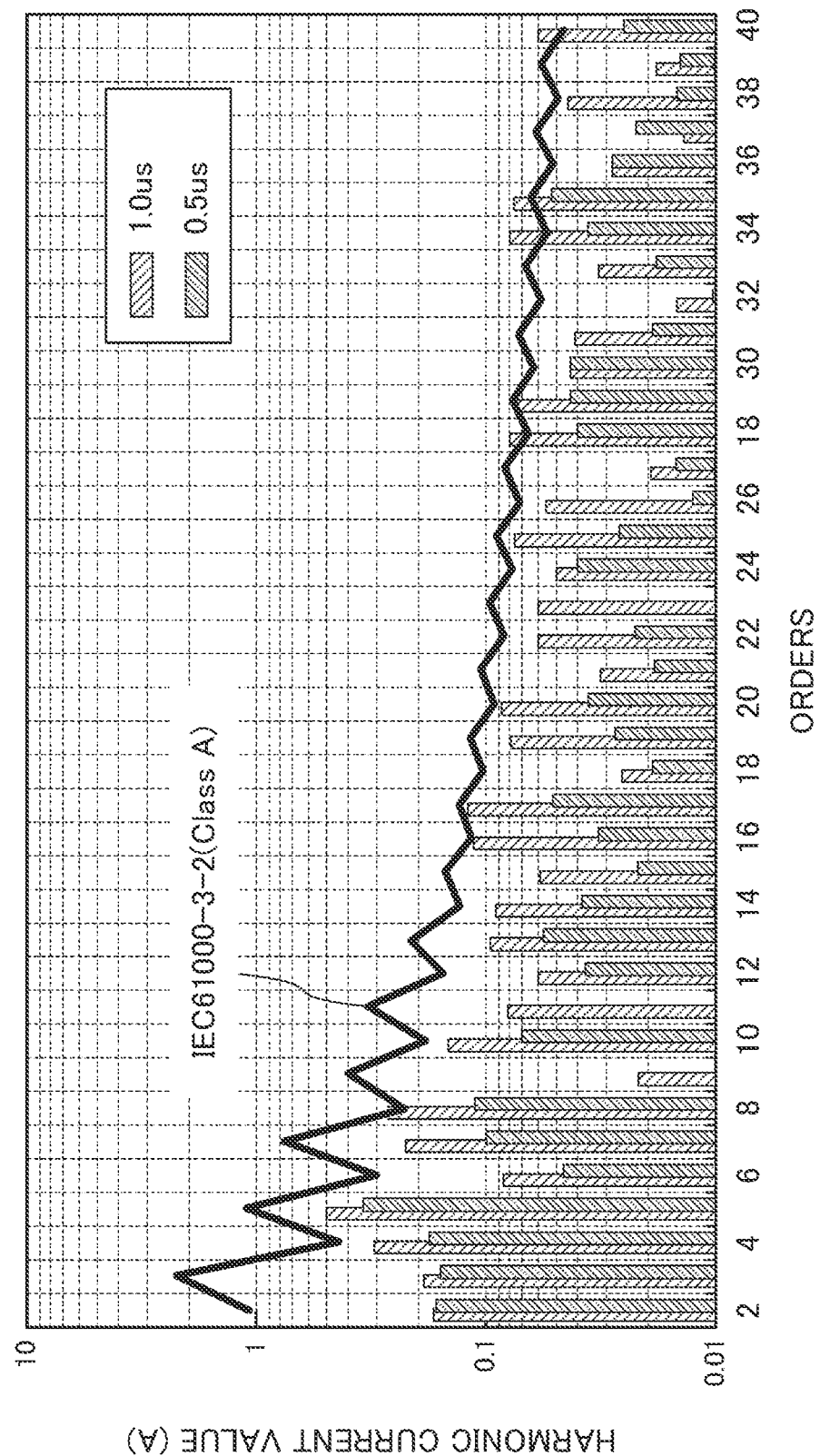

POWER CONVERTER AND HEAT PUMP SYSTEM PROVIDED THEREWITH

CROSS-REFERENCE TO RELATED APPLICATIONS

This is a continuation of International Application No. PCT/JP2021/035881 filed on Sep. 29, 2021, which claims priority to Japanese Patent Application No. 2020-163992, filed on Sep. 29, 2020. The entire disclosures of these applications are incorporated by reference herein.

BACKGROUND

Technical Field

The present disclosure relates to a power converter including a power conversion unit that performs power conversion for a three-phase alternating current output from an alternating-current power source and a current compensation unit that supplies a compensating current to the alternating-current power source, and to a heat pump system including the power converter.

Background Art

Japanese Unexamined Patent Publication No. 2015-92813 discloses a power converter including a power conversion unit that performs power conversion for a three-phase alternating current output from an alternating-current power source and a current compensation unit that supplies a compensating current to the alternating-current power source. In this power converter, the current compensation unit includes a current compensation unit inverter including a plurality of switching elements, a current compensation unit capacitor connected between direct-current-side nodes of the current compensation unit inverter, a current compensation unit reactor connected between the alternating current side of the current compensation unit inverter and the alternating-current power source, a compensation controller that obtains an output voltage command value such that a harmonic component contained in a power-source current supplied to the power converter from the alternating-current power source is reduced by the compensating current, and a drive signal generator that generates a drive signal for driving the plurality of switching elements by a three-phase modulation method based on the output voltage command value.

SUMMARY

A first aspect of the present disclosure is directed to a power converter including a power conversion unit that performs power conversion for a three-phase alternating current output from an alternating-current power source, and a current compensation unit that supplies a compensating current to the alternating-current power source. The current compensation unit includes a current compensation unit inverter including a plurality of switching elements, a current compensation unit capacitor connected between direct-current-side nodes of the current compensation unit inverter, a current compensation unit reactor connected between the alternating current side of the current compensation unit inverter and the alternating-current power source, a compensation controller that obtains an output voltage command value such that a harmonic component contained in a power-source current supplied to the power converter from the alternating-current power source is reduced by the compensating current, and a drive signal generator that generates, based on the output voltage command value, a drive signal usable to drive the switching elements by a three-phase modulation method. The current compensation unit inverter supplies, by switching operation of the switching elements, the compensating current to the alternating-current power source via the current compensation unit reactor. $Td \leq (34.00/fsw - 0.145)(1.55 - 0.055*Pmax)$, where fsw represents a carrier frequency employed for generation of the drive signal, Pmax represents a maximum input power of the power conversion unit, and Td represents a dead time for the drive signal.

BRIEF DESCRIPTION OF THE DRAWINGS

FIG. 18 is a graph showing the plot of the upper limit for harmonic current emissions as specified in IEC61000-3-2 and current values of the harmonic component contained in the power-source current against the orders in a case where the second carrier frequency is 48 kHz, the maximum input power of the power conversion unit is 10 kW, and the dead time is 0.5 μs and 1.0 μs, where the two-phase modulation method is employed.

DETAILED DESCRIPTION OF EMBODIMENT(S)

Hereinafter, embodiments of the present disclosure will be described with reference to the drawings. The following embodiments are merely exemplary ones in nature, and are not intended to limit the scope, application, or use of the present invention.

First Embodiment

Figure 1:
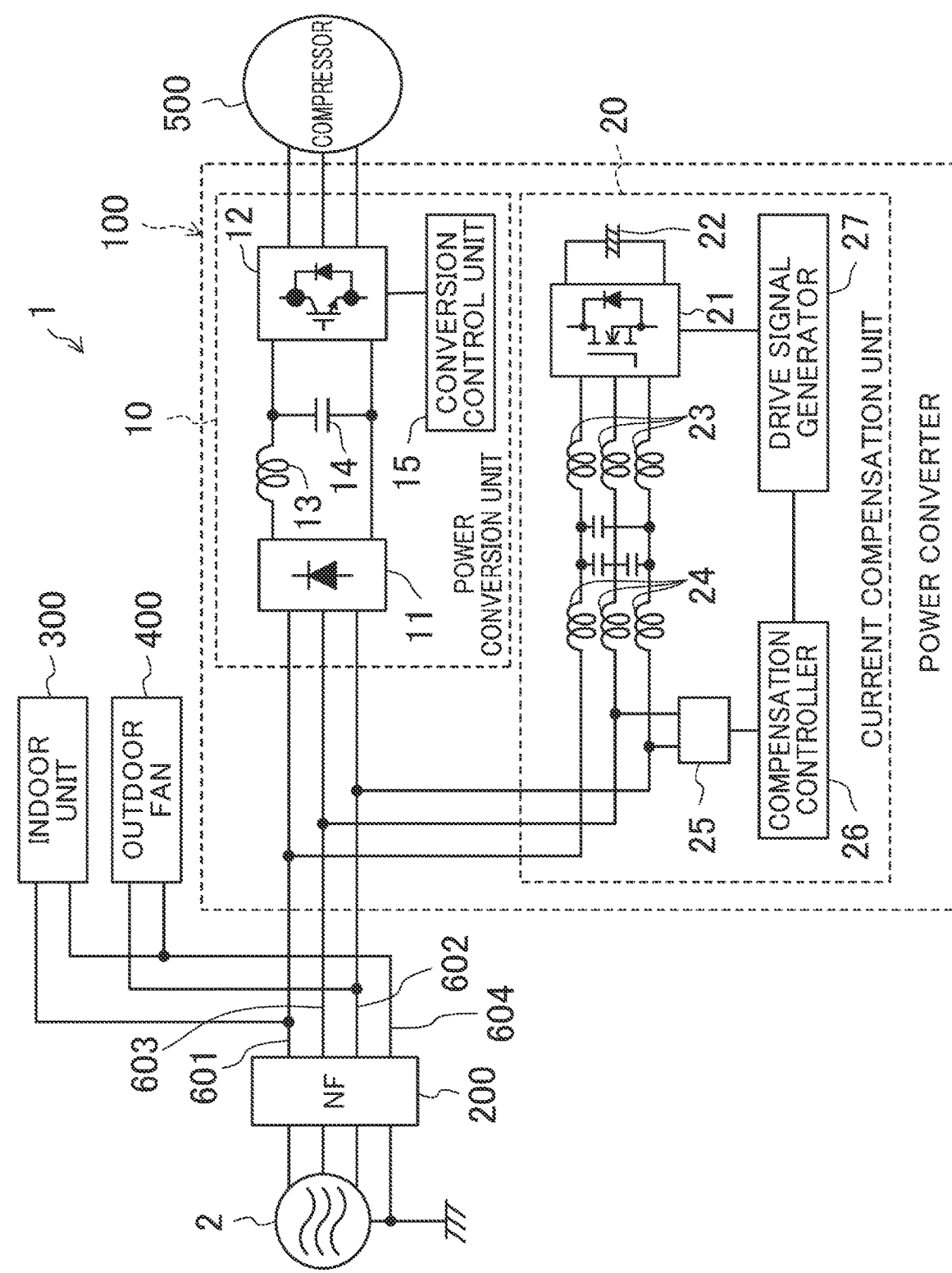
FIG. 1 is a block diagram showing a configuration of an air-conditioning system.

FIG. 1 shows an air-conditioning system (1) as a heat pump system. The air-conditioning system (1) includes a power converter (100) according to a first embodiment of the present disclosure, a noise filter (200), an indoor unit (300) as a harmonic generation source, an outdoor fan (400) as a harmonic generation source, and a compressor (500).

The power converter (100) performs power conversion for a three-phase alternating current output from an alternating-current power source (2) and received via the noise filter (200). The alternating-current power source (2) is a three-phase four-wire alternating-current power source. The three-phase alternating current is input to the power converter (100) via three first to third conductive wires (601, 602, 603).

The indoor unit (300) is driven with an alternating current received via the first conductive wire (601) and a neutral wire (604). The indoor unit (300) generates a harmonic at the first conductive wire (601).

The outdoor fan (400) is driven with a power received via the second conductive wire (602) and the neutral wire (604). The outdoor fan (400) generates a harmonic at the second conductive wire (602).

Figure 2:
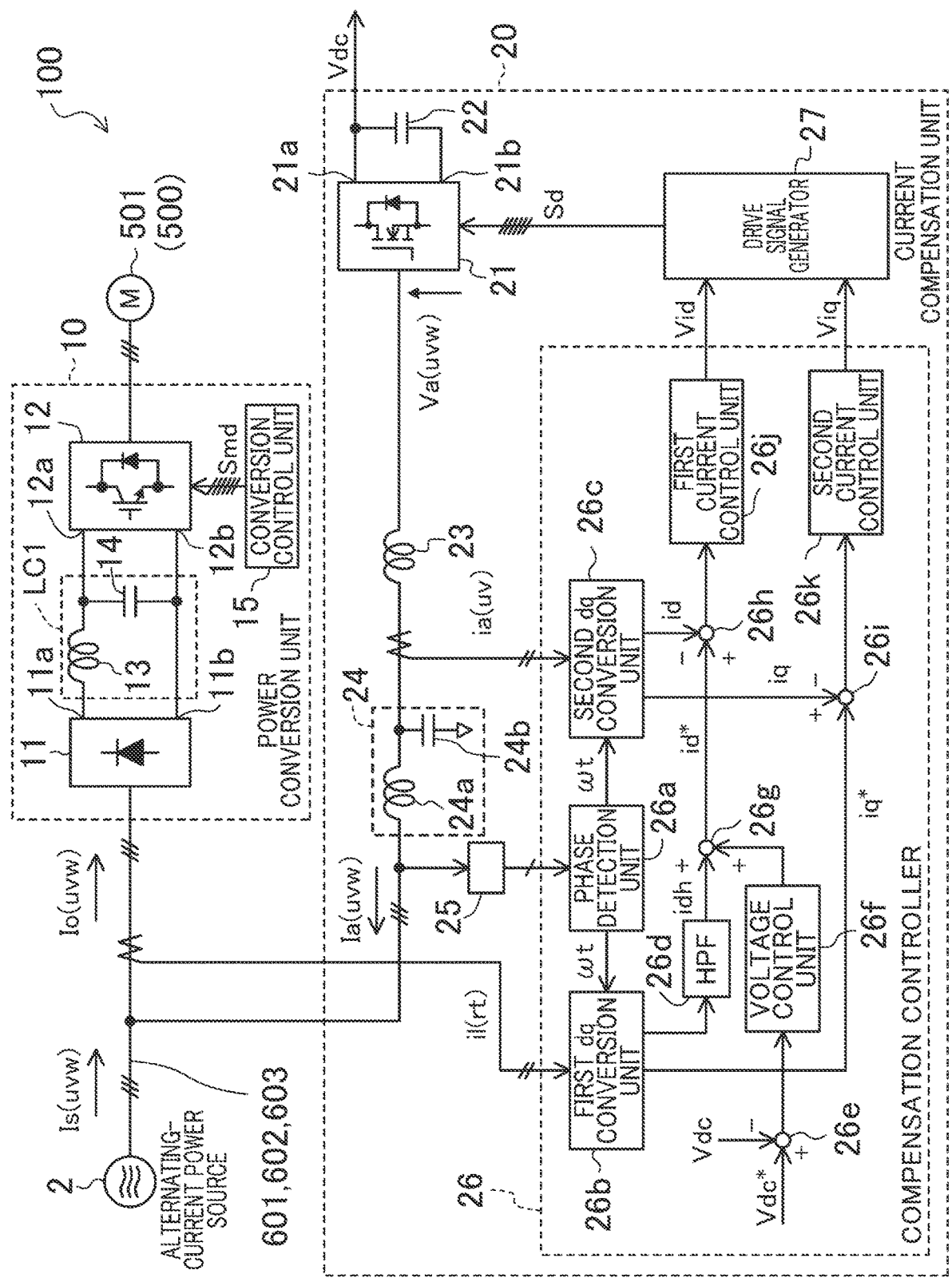
FIG. 2 is a block diagram showing a configuration of a power converter according to a first embodiment of the present disclosure.

The compressor (500) includes a motor (501) (see FIG. 2). The motor (501) receives the alternating current obtained by power conversion performed by the power converter (100).

As shown in FIG. 2, the power converter (100) includes a power conversion unit (10) and a current compensation unit (20).

The power conversion unit (10) performs power conversion for the three-phase alternating current output from the alternating-current power source (2) and received via the first to third conductive wires (601, 602, 603). More specifically, the power conversion unit (10) includes a rectifier circuit (11), a power conversion unit inverter (12), a power conversion unit reactor (13), a power conversion unit capacitor (14), and a conversion control unit (15).

The rectifier circuit (11) rectifies the three-phase alternating current output from the alternating-current power source (2) into a direct current, and outputs the direct current to first and second output nodes (11a, 11b). More specifically, the rectifier circuit (11) is a full-wave rectifier circuit. The rectifier circuit (11) includes six diodes (not shown) connected in a bridge configuration. These diodes are directed with their cathodes facing a first output node (11*a*) side and their anodes facing a second output node (11*b*) side.

The power conversion unit inverter (12) converts the direct current output from the rectifier circuit (11) into an alternating current, and outputs the alternating current to the motor (501) of the compressor (500). More specifically, the power conversion unit inverter (12) includes six switching elements (not shown) and six freewheeling diodes (not shown). The six switching elements are connected in a bridge configuration. That is, the power conversion unit inverter (12) includes three switching legs connected between first and second DC nodes (12*a*, 12*b*). Each switching leg includes two switching elements connected to each other in series.

Each of the three switching legs includes an upper-arm switching element and a lower-arm switching element, and a midpoint between the upper and lower switching elements is connected to corresponding one of coils of phases (i.e., u-phase, v-phase, or w-phase coils) of the motor (501). Freewheeling diodes are connected to the respective one of the switching elements in an antiparallel manner.

One end of the power conversion unit reactor (13) is connected to the first output node (11*a*) of the rectifier circuit (11), and the other end of the power conversion unit reactor (13) is connected to the first DC node (12*a*) of the power conversion unit inverter (12).

The power conversion unit capacitor (14) is connected between the first and second DC nodes (12*a*, 12*b*) of the power conversion unit inverter (12). Thus, the power conversion unit reactor (13) is connected between the alternating-current power source (2) and one end of the power conversion unit capacitor (14).

The capacitance value of the power conversion unit capacitor (14) is set such that the capacitance value can successfully reduce ripple voltage caused due to switching operation of the power conversion unit inverter (12) while the capacitance value can allow fluctuation in the output voltage of the rectifier circuit (11). The ripple voltage is voltage fluctuation corresponding to the switching frequency of the switching element. Thus, a DC link voltage which is the voltage of the power conversion unit capacitor (14) contains a ripple component fluctuating corresponding to the frequency of the alternating-current voltage of the alternating-current power source (2).

More specifically, the capacitance of the power conversion unit capacitor (14) is set such that fluctuation in the voltage of the power conversion unit capacitor (14) during a switching cycle is 1/10 or less of the average voltage of the power conversion unit capacitor (14). Thus, the minimum necessary capacitance of the power conversion unit capacitor (14) is determined depending on the switching frequency and on a motor current flowing between the motor (501) and the power conversion unit capacitor (14).

By setting the capacitance value C of the power conversion unit capacitor (14) such that Expression (I) below is satisfied, the fluctuation in the voltage of the power conversion unit capacitor (14) during the switching cycle can be 1/10 or less of the average voltage of the power conversion unit capacitor (14). In Expression (I), fluctuation in the output voltage of the rectifier circuit (11) superimposed on the DC link voltage is ignored, VAdc represents the average value of the DC link voltage, Imax represents the peak value of the motor current obtained at the maximum alternating-current power, and Ts represents the switching cycle.

$$C \geq (10 \cdot Imax \cdot Ts)/VAdc \qquad \text{(I)}$$

Here, the switching cycle is a length of intervals at which the switching element is repeatedly turned on and off. In the first embodiment, the switching element is under PWM control. Thus, the switching cycle corresponds to a carrier period for a first carrier wave used for the PWM control.

The power conversion unit capacitor (14) is configured as, for example, a film capacitor.

With such a relatively-small capacitance, the power conversion unit capacitor (14) hardly smooths the output voltage of the rectifier circuit (11). As a result, the ripple component corresponding to the frequency of the alternating-current power source (2) remains in the DC link voltage. The alternating-current power source (2) is a three-phase power source. Thus, the ripple component corresponding to the frequency of the alternating-current power source (2) has a frequency that is six times as high as the frequency of the alternating-current power source (2).

An inductance component between the alternating-current power source (2) and the power conversion unit capacitor (14) and the power conversion unit capacitor (14) form a power conversion unit filter (LC1). The inductance component includes the reactor (13). The capacitance of the power conversion unit capacitor (14) is set such that the power conversion unit filter (LC1) attenuates a first carrier frequency component contained in the current. Here, the first carrier frequency is the frequency of the first carrier wave used for generating a control signal for the power conversion unit inverter (12). This configuration can reduce fluctuation in the current flowing between the power conversion unit inverter (12) and the alternating-current power source (2), the fluctuation corresponding to the first carrier frequency due to the switching operation of the power conversion unit inverter (12).

The conversion control unit (15) controls ON/OFF of each switching element of the power conversion unit inverter (12) according to a control signal (Smd).

The current compensation unit (20) supplies a compensating current (Ia(uvw)) to the alternating-current power source (2). Here, the direction of the compensating current (Ia(uvw)) from the alternating-current power source (2) to the current compensation unit (20) is assumed to be a negative direction. For each phase, a power-source current (Is(uvw)) supplied from the alternating-current power source (2) is a difference between a load current (Io(uvw)) directed from the alternating-current power source (2) to the power conversion unit (10) and the compensating current (Ia(uvw)).

The current compensation unit (20) includes a current compensation unit inverter (21), a current compensation unit capacitor (22), current compensation unit reactors (23) corresponding to the respective phases, current compensation unit filters (24) corresponding to the respective phases, a voltage detector (25), a compensation controller (26), and a drive signal generator (27).

Figure 3:
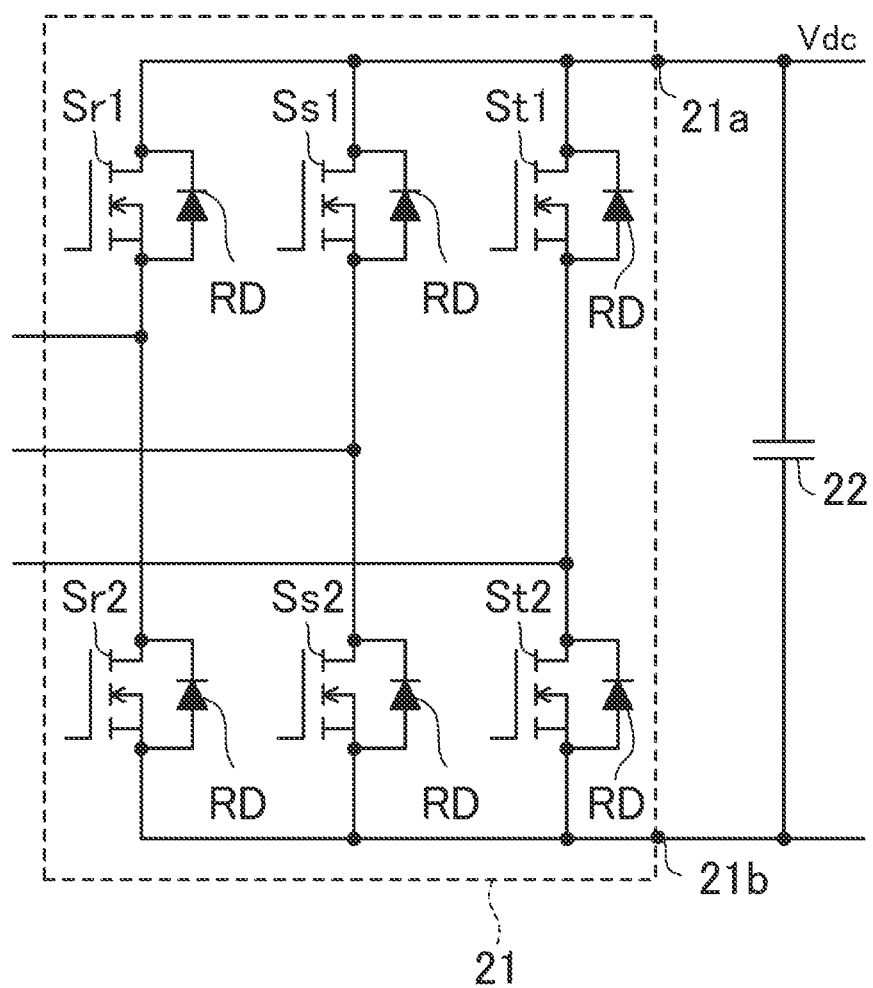
FIG. 3 is a circuit diagram of a current compensation unit inverter.

As shown in FIG. 3, the current compensation unit inverter (21) includes six switching elements (Sr1, Sr2, Ss1, Ss2, St1, St2). The switching elements (Sr1, Sr2, Ss1, Ss2, St1, St2) are unipolar transistors, and are metal oxide semiconductor field effect transistors (MOSFET) made of a wide-bandgap semiconductor material as a main material. The on-resistance of the switching elements (Sr1, Sr2, Ss1, Ss2, St1, St2) is 100 mΩ or less. The six switching elements (Sr1, Sr2, Ss1, Ss2, St1, St2) form three switching legs connected between first and second direct-current-side nodes (21*a*, 21*b*). Each switching leg includes two switching elements (Sr1, Sr2, Ss1, Ss2, St1, St2) connected to each other in series.

Each of the three switching legs includes an upper-arm switching element (Sr1, Ss1, St1) and a lower-arm switching element (Sr2, Ss2, St2), and a midpoint between the upper and lower switching elements is an alternating-current-side node. Each switching element (Sr1, Sr2, Ss1, Ss2, St1, St2) includes a body diode (RD). The body diode (RD) serves as a freewheeling element that causes the current to flow in the opposite direction.

Instead of the unipolar transistors, the switching elements (Sr1, Sr2, Ss1, Ss2, St1, St2) may be insulated gate bipolar transistors (IGBT) which are a bipolar transistor. In this case, the freewheeling diodes are connected to the respective switching elements (Sr1, Sr2, Ss1, Ss2, St1, St2) in an antiparallel manner.

Even in a case where the switching elements (Sr1, Sr2, Ss1, Ss2, St1, St2) are the unipolar transistors as in the first embodiment, the freewheeling diodes, which are lower in forward voltage than the body diode (RD) as in the configuration in which the switching elements (Sr1, Sr2, Ss1, Ss2, St1, St2) are the IGBTs, may be connected to the respective switching elements (Sr1, Sr2, Ss1, Ss2, St1, St2) in an antiparallel manner.

The current compensation unit capacitor (22) is connected between the direct-current-side nodes (21a, 21b) of the current compensation unit inverter (21). The voltage of the current compensation unit capacitor (22), i.e., the voltage between the direct-current-side nodes (21a, 21b) of the current compensation unit inverter (21), is a direct-current voltage (Vdc). The capacitance of the current compensation unit capacitor (22) is greater than the capacitance of the power conversion unit capacitor (14).

One end of the current compensation unit reactor (the u-phase, v-phase, or w-phase current compensation unit reactor) (23) of each phase is connected to any one of the alternating-current-side node of the current compensation unit inverter (21). The other end of each current compensation unit reactor (23) is connected to the alternating-current power source (2) via a corresponding one of the current compensation unit filters (24). That is, the current compensation unit reactor (23) is connected between the alternating current side of the current compensation unit inverter (21) and the alternating-current power source (2).

The current compensation unit filter (24) of each phase is interposed between the alternating-current power source (2) and the current compensation unit reactor (23). Each current compensation unit filter (24) has a filter reactor (24a) having a smaller inductance than that of the current compensation unit reactor (23), and a filter capacitor (24b). The resonance frequency of each current compensation unit filter (24) is set to 4 kHz or higher.

The voltage detector (25) detects a line voltage between lines corresponding to two of the three phases of the power-source voltages output from the alternating-current power source (2).

According to the above-described configuration, the current compensation unit inverter (21) supplies, according to the switching operation of the switching elements (Sr1, Sr2, Ss1, Ss2, St1, St2), the compensating current (Ia(uvw)) to the alternating-current power source (2) via the current compensation unit reactors (23).

The compensation controller (26) obtains, based on the direct-current voltage (Vdc) between the direct-current-side nodes (21a, 21b) of the current compensation unit inverter (21) and on the load current (Io(uvw)) flowing into the power conversion unit (10) from the alternating-current power source (2), output voltage command values (Vid, Viq) such that the harmonic component contained in the power-source current (Is(uvw)) supplied to the power converter (100) is reduced by the compensating current (Ia(uvw)). More specifically, the compensation controller (26) includes a phase detection unit (26a), first and second dq conversion units (26b, 26c), a high-pass filter (26d), a first subtraction unit (26e), a voltage control unit (26f), a first addition unit (26g), second and third subtraction units (26h, 26i), and first and second current control units (26j, 26k).

The phase detection unit (26a) detects the phase (ωt) of the power-source voltage based on the line voltage detected by the voltage detector (25). The voltage detector (25) may detect a difference between the power-source voltage of one of the three phases from the alternating-current power source (2) and the voltage of the neutral wire (604), i.e., a phase voltage, so that the phase detection unit (26a) may detect the phase (ωt) of the power-source voltage based on the phase voltage.

The first dq conversion unit (26b) detects at least currents (il(rt)) of two phases from a current (il(rst)) proportional to the load current (Io(uvw)), and obtains a d-axis component and a q-axis component (iq*) of the load current (Io(uvw)) by three-phase/two-phase conversion. The d-axis and the q-axis are coordinate axes of a rotating coordinate system synchronized with the phase (ωt) detected by the phase detection unit (26a). The d-axis component is an active component, and the q-axis component is a reactive component. The current (il(rst)) has three phases, and therefore, if the currents (il(rt)) of two phases can be detected, the d-axis component and the q-axis component (iq*) of the load current (Io(uvw)) can be obtained by calculation of the current of the remaining one phase.

The second dq conversion unit (26c) detects reactor currents (ia(uv)) of two phases from a current (ia(uvw)) proportional to the current flowing in the current compensation unit reactor (23), and obtains a d-axis component (id) and a q-axis component (iq) of the compensating current (Ia(uvw)) by three-phase/two-phase conversion. The current (ia(uvw)) has three phases, and therefore, if the currents (ia(uv)) of two phases can be detected, the d-axis component (id) and the q-axis component (iq) of the compensating current (Ia(uvw)) can be obtained by calculation of the current of the remaining one phase.

The high-pass filter (26d) outputs a high-frequency component (idh) of the d-axis component of the load current (Io(uvw)) obtained by the first dq conversion unit (26b).

The first subtraction unit (26e) subtracts, from an output voltage command value (Vdc*), the direct-current voltage (Vdc) between the direct-current-side nodes (21a, 21b) of the current compensation unit inverter (21), and outputs the subtraction result.

The voltage control unit (26f) performs proportional integral control on the subtraction result output from the first subtraction unit (26e), thereby to obtain a correction value.

The first addition unit (26g) adds up the high-frequency component (idh) of the d-axis component output from the high-pass filter (26d) and the correction value obtained by the voltage control unit (26f), and outputs the addition result as a command value (id*) for the d-axis component.

The second subtraction unit (26h) subtracts the d-axis component (id) of the compensating current (Ia(uvw)) obtained by the second dq conversion unit (26c) from the command value (id*) output from the first addition unit (26g), and outputs the subtraction result.

The third subtraction unit (26i) subtracts the q-axis current (iq) of the compensating current (Ia(uv)) obtained by the second dq conversion unit (26c) from the q-axis current (iq*) of the load current (Io(uvw)) obtained by the first dq conversion unit (26b), and outputs the subtraction result.

The first current control unit (26j) generates the output voltage command value (Vid) for the d-axis component such that the subtraction result output from the second subtraction unit (26h) decreases. The first current control unit (26j) may generate the output voltage command value (Vid) for the d-axis component by the proportional integral control, for example.

The second current control unit (26k) generates the output voltage command value (Viq) for the q-axis component such that the subtraction result output from the third subtraction unit (26i) decreases. The second current control unit (26k) may generate the output voltage command value (Viq) for the q-axis component by the proportional integral control, for example.

By a three-phase modulation method, the drive signal generator (27) generates, based on the output voltage command values (Vid, Viq), a drive signal (Sd) for driving the switching elements (Sr1, Sr2, Ss1, Ss2, St1, St2) of the current compensation unit inverter (21), so as to cause the current compensation unit inverter (21) to perform synchronous rectification operation. A second carrier frequency, which is the frequency of a second carrier wave used for generating the drive signal (Sd) is set to 100 kHz or less. In case where the switching elements (Sr1, Sr2, Ss1, Ss2, St1, St2) are driven according to the drive signal (Sd) with a dead time for the drive signal (Sd), an error is caused between an actual output voltage (Va(uvw)) on the alternating current side of the current compensation unit inverter (21) and the output voltage command value (Vid, Viq).

Figure 4:
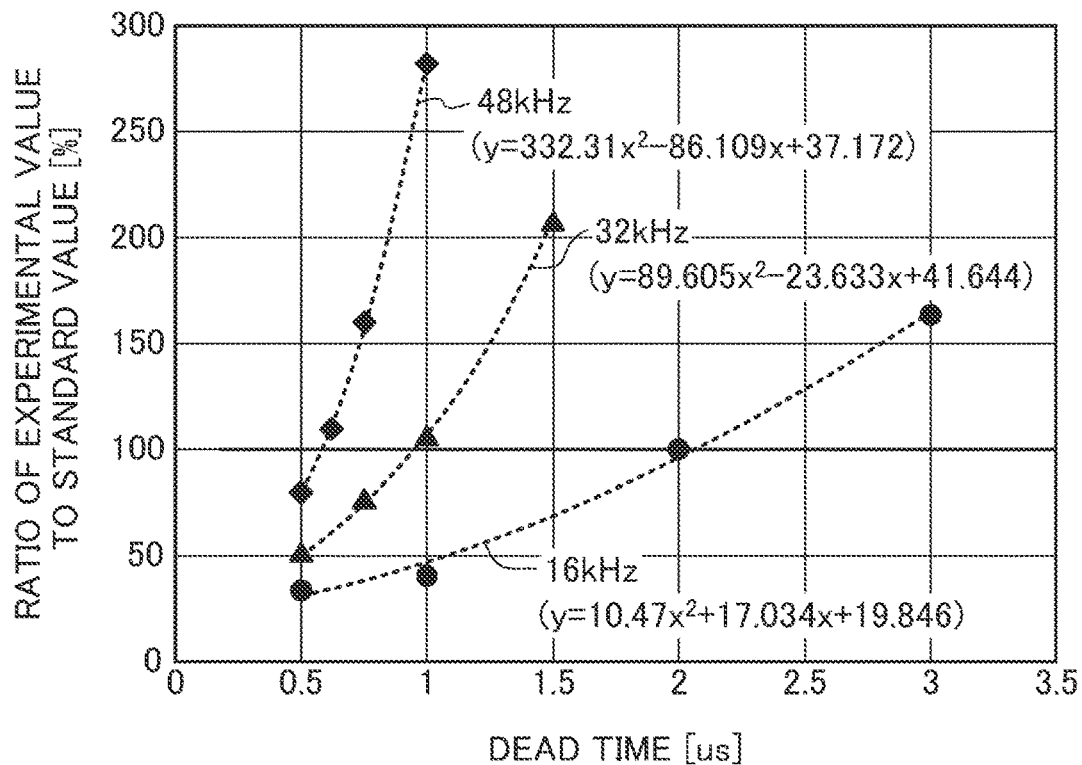
FIG. 4 is a graph showing a relationship between a dead time for a drive signal and the ratio of the amount of the harmonic component emitted in the experiment to the upper limit for harmonic current emissions as specified in IEC61000-3-2, where a three-phase modulation method is employed.

In the power converter (100) configured as described above, a relationship between the dead time for the drive signal (Sd) and the ratio of the amount of the harmonic component contained in the power-source current (Is(uvw)) in the experiment to the upper limit for harmonic current emissions as specified in IEC61000-3-2, which is the harmonic standard stipulated by the International Electrotechnical Commission (IEC) (i.e., the ratio of the experimental value to the standard value) is as shown in FIG. 4. FIG. 4 shows cases where the second carrier frequency is 16 kHz, 32 kHz, and 48 kHz. The second carrier frequency is the frequency of the second carrier wave used for generating the drive signal (Sd). Based on the relationship shown in FIG. 4, it is estimated that, for a greater second carrier frequency, the dead time needs to be shorter in order for the power-source current (Is(uvw)) to meet the standard.

Figure 5:
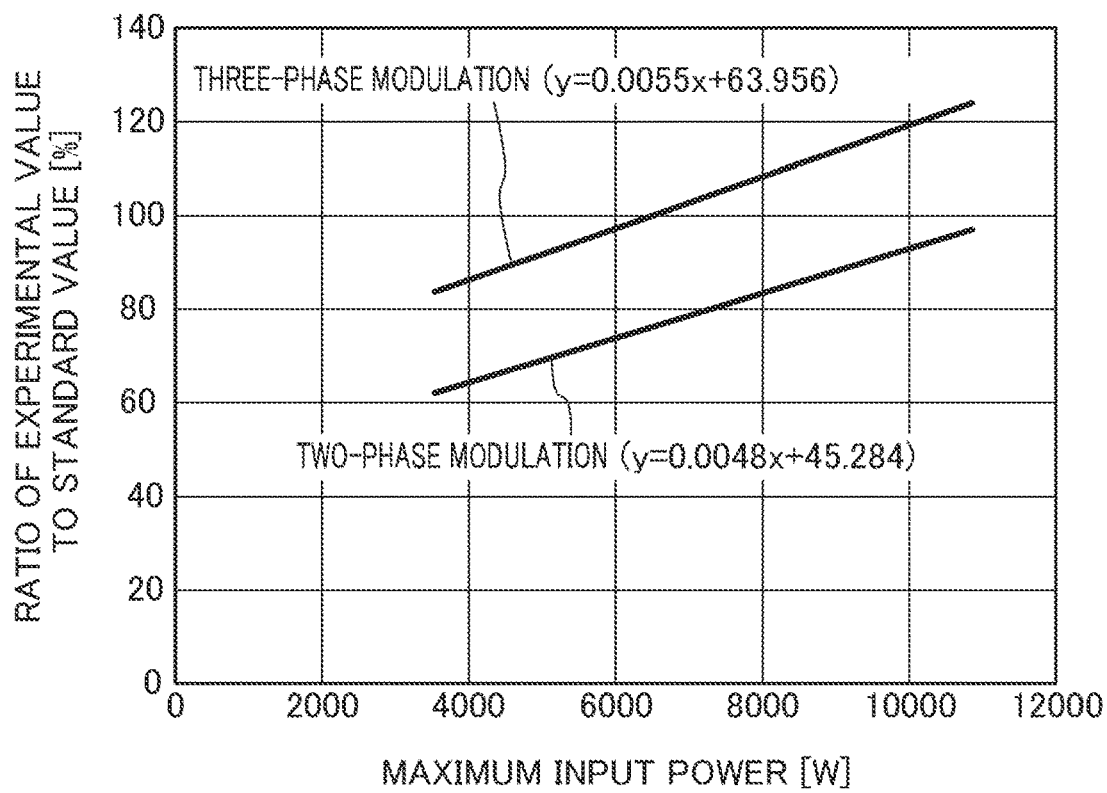
FIG. 5 is a graph showing a relationship between the maximum input power of a power conversion unit and the ratio of the amount of the harmonic component emitted in the experiment to the upper limit for harmonic current emissions as specified in IEC61000-3-2, where the three-phase modulation method is employed and a two-phase modulation method is employed.

In the power converter (100) configured as described above, a relationship between the maximum input power of the power conversion unit (10) and the ratio (the ratio of the experimental value to the standard value) of the amount of the harmonic component contained in the power-source current (Is(uvw)) in the experiment to the upper limit for harmonic current emissions as specified in IEC61000-3-2 (i.e., the ratio of the experimental value to the standard value) is as shown in FIG. 5. FIG. 5 shows a case where the three-phase modulation method is employed for generation of the drive signal (Sd) and a case where a two-phase modulation method is employed for generation of the drive signal (Sd), assuming that the second carrier frequency is 16 kHz and the dead time is 3.0 µs. Based on the relationship shown in FIG. 5, it is estimated that as the maximum input power of the power conversion unit (10) increases, the amount of the harmonic component increases.

Figures 6, 7:
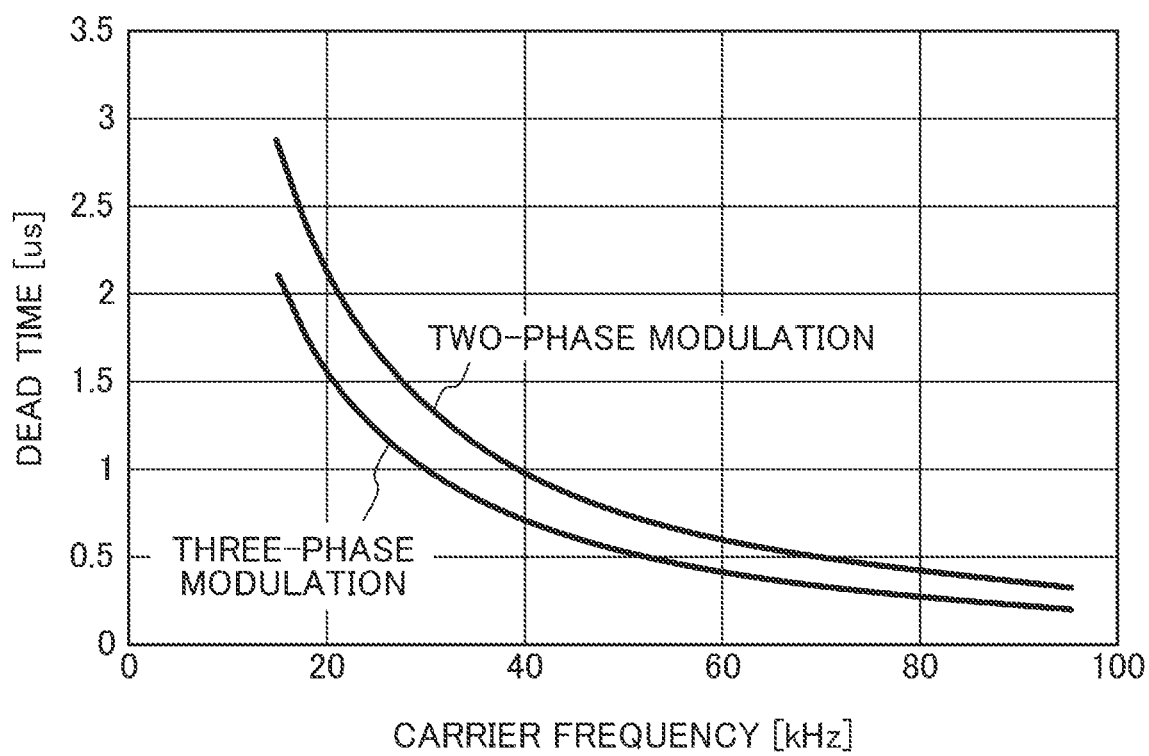
FIG. 6 is a table showing, for plural types of second carrier frequencies, the dead time with which the amount of the harmonic component in a power-source current reaches the upper limit for harmonic current emissions as specified in IEC61000-3-2, where either the three-phase modulation method or the two-phase modulation method is employed.
FIG. 7 is a graph corresponding to the table of FIG. 6.

FIG. 6 is a table showing, for plural types of second carrier frequencies, the dead time (µs) when the amount of the harmonic component contained in the power-source current (Is(uvw)) reaches the upper limit for harmonic current emissions as specified in IEC61000-3-2 in a case where the maximum input power of the power conversion unit (10) is 10 kW. FIG. 7 is a graph corresponding to the table of FIG. 6. FIGS. 6 and 7 show the dead time in a case where the three-phase modulation method is employed for generation of the drive signal (Sd) and a case where the two-phase modulation method is employed for generation of the drive signal (Sd).

Figure 8:
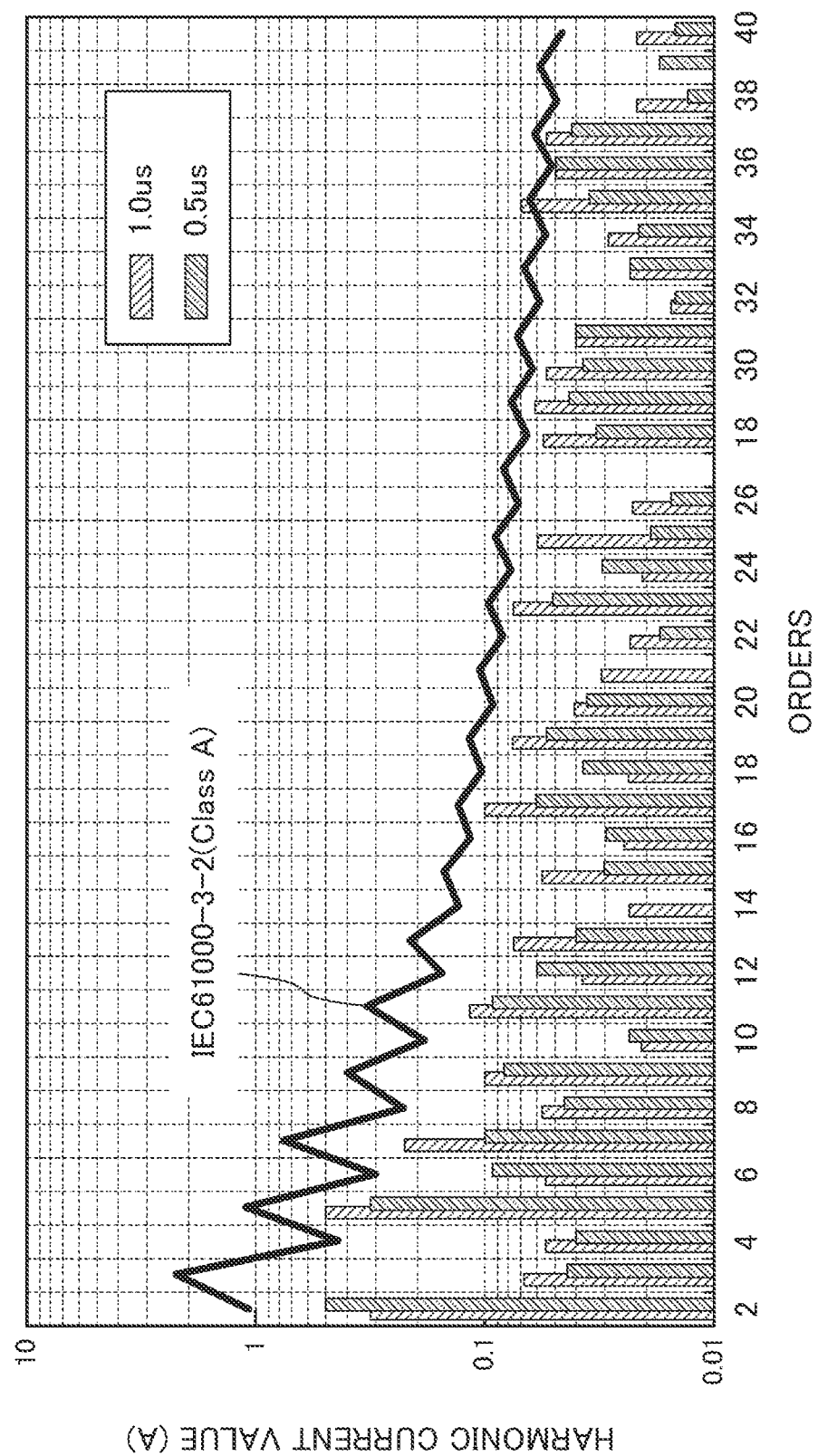
FIG. 8 is a graph showing the plot of the upper limit for harmonic current emissions as specified in IEC61000-3-2 and current values of the harmonic component contained in the power-source current against the orders in a case where the second carrier frequency is 32 kHz, the maximum input power of the power conversion unit is 10 kW, and the dead time is 0.5 μs and 1.0 μs, where the three-phase modulation method is employed.

FIG. 8 shows current values of the harmonic component contained in the power-source current (Is(uvw)) against the orders in a case where the second carrier frequency is 32 kHz, the maximum input power of the power conversion unit (10) is 10 kW, and the dead time is 0.5 µs and 1.0 µs. In the case where the dead time is 1.0 µs, the harmonic component at the 35th order exceeds the upper limit for harmonic current emissions as specified in IEC61000-3-2. In the case where the dead time is 0.5 µs, the harmonic components fall below the upper limit for harmonic current emissions as specified in IEC61000-3-2 at all the orders.

Based on the information shown in FIGS. 4 to 8, the inventors have found that by setting the dead time for the drive signal (Sd) such that Expression (II) below is satisfied, the harmonic component contained in the power-source current (Is(uvw)) can be effectively reduced and the power-source current (Is(uvw)) can easily meet IEC61000-3-2.

Hereinafter, in Expression (II) below, fsw (kHz) represents the second carrier frequency, Pmax (kW) represents the maximum input power of the power conversion unit (10), and Td (µs) represents the dead time for the drive signal (Sd).

$$Td \leq (34.00/fsw - 0.145)(1.55 - 0.055 * Pmax) \quad (II)$$

In the first embodiment, the drive signal generator (27) generates the drive signal (Sd) such that Expression (II) below is satisfied.

In the first embodiment, the drive signal generator (27) generates the drive signal (Sd) such that not only Expression (II) but also Expressions (III) and (IV) below are satisfied.

In Expressions (III) and (IV), fsw (kHz) represents the second carrier frequency, Pmax (kW) represents the maximum input power of the power conversion unit (10), Td (µs) represents the dead time for the drive signal (Sd), and Lac (mH) represents the inductance of the current compensation unit reactor (23) when the current flowing in the current compensation unit reactor (23) is 0 A.

$$Lac \leq 16/Pmax \quad (III)$$

$$Td \leq (34.00/fsw - 0.145) \quad (IV)$$

Figure 9A:
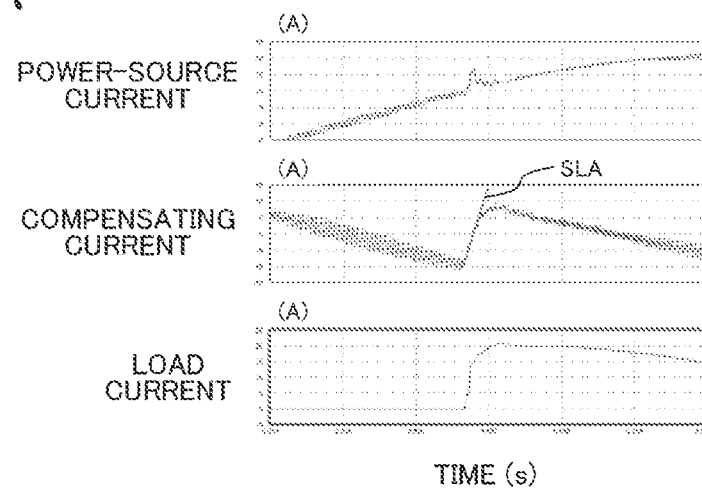
FIG. 9A is a timing chart of the power-source current, a compensating current, and a load current in a case where the dead time for the drive signal is 0.5 μs, the second carrier frequency is 16 kHz, the maximum input power of the power conversion unit is 10 kW, and the inductance of a current compensation unit reactor with a current of 0 A flowing in the current compensation unit reactor is 1.0 mH.
Figure 9B:
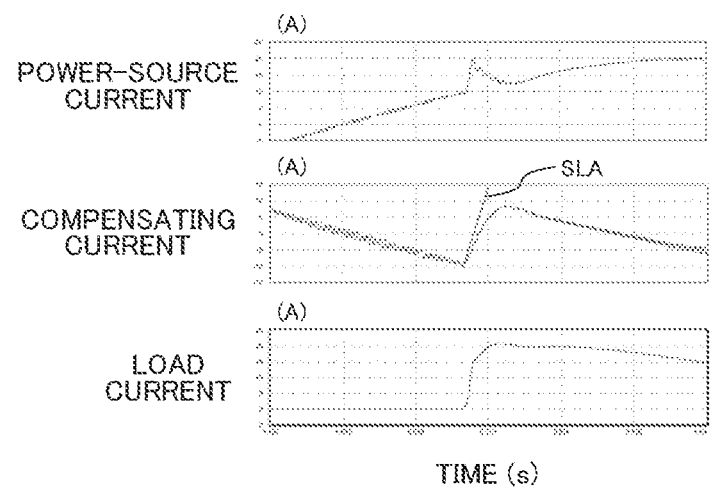
FIG. 9B is a timing chart corresponding to FIG. 9A, illustrating a case where the maximum input power of the power conversion unit is 10 kW and the inductance of the current compensation unit reactor with a current of 0 A flowing in the current compensation unit reactor is 2.2 mH.
Figure 9C:
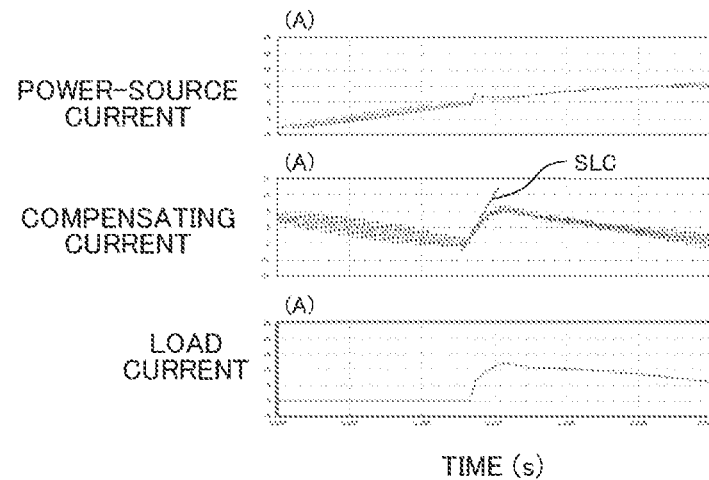
FIG. 9C is a timing chart corresponding to FIG. 9A, illustrating a case where the maximum input power of the power conversion unit is 5 kW and the inductance of the current compensation unit reactor with a current of 0 A flowing in the current compensation unit reactor is 1.0 mH.
Figure 9D:
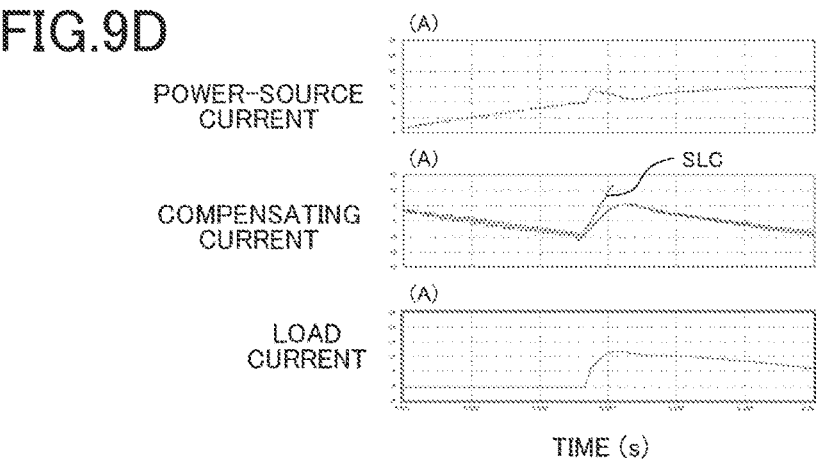
FIG. 9D is a timing chart corresponding to FIG. 9A, illustrating a case where the maximum input power of the power conversion unit is 5 kW and the inductance of the current compensation unit reactor with a current of 0 A flowing in the current compensation unit reactor is 2.2 mH.

FIG. 9A shows the power-source current (Is(uvw)), the compensating current (Ia(uvw)), and the load current (Io(uvw)) in a case where the dead time for the drive signal (Sd) is 0.5 µs, the second carrier frequency is 16 kHz, the maximum input power of the power conversion unit (10) is 10 kW, and the inductance of the current compensation unit reactor (23) with the current of 0 A flowing in the current compensation unit reactor (23) is 1.0 mH. FIG. 9B is a timing chart corresponding to FIG. 9A, illustrating a case where the dead time for the drive signal (Sd) is 0.5 µs, the second carrier frequency is 16 kHz, the maximum input power of the power conversion unit (10) is 10 kW, and the inductance of the current compensation unit reactor (23) with the current of 0 A flowing in the current compensation unit reactor (23) is 2.2 mH. FIG. 9C is a timing chart corresponding to FIG. 9A, illustrating a case where the dead time for the drive signal (Sd) is 0.5 µs, the second carrier frequency is 16 kHz, the maximum input power of the power conversion unit (10) is 5 kW, and the inductance of the current compensation unit reactor (23) with the current of 0 A flowing in the current compensation unit reactor (23) is 1.0 mH. FIG. 9D is a timing chart corresponding to FIG. 9A, illustrating a case where the dead time for the drive signal (Sd) is 0.5 µs, the second carrier frequency is 16 kHz, the maximum input power of the power conversion unit (10) is 5 kW, and the inductance of the current compensation unit reactor (23) with the current of 0 A flowing in the current compensation unit reactor (23) is 2.2 mH.

In FIG. 9B, the inductance of the current compensation unit reactor (23) is greater than that in the case of FIG. 9A, and therefore, the gradient of a change in the compensating current (Ia(uvw)) according to a change in the load current (Io(uvw)) is gentler than a gradient SLA in FIG. 9A. Accordingly, the harmonic component contained in the power-source current (Is(uvw)) increases, and the waveform of the power-source current (Is(uvw)) is distorted. Thus, it is difficult to make the power-source current (Is(uvw)) meet IEC61000-3-2. Also in FIG. 9D, the inductance of the current compensation unit reactor (23) is greater than that in the case of FIG. 9C, and therefore, the gradient of a change in the compensating current (Ia(uvw)) according to a change in the load current (Io(uvw)) is gentler than a gradient SLC in FIG. 9C. However, the maximum input power of the power conversion unit (10) is smaller, and therefore, the harmonic component contained in the power-source current (Is(uvw)) and the distortion of the waveform of the power-source current (Is(uvw)) are equivalent to those in FIG. 9A. Thus, it is easy to make the power-source current (Is(uvw)) meet IEC61000-3-2.

Figure 10:
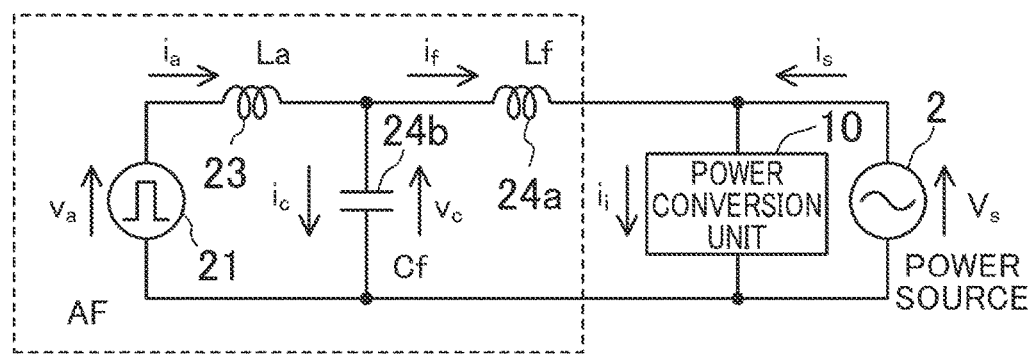
FIG. 10 is a circuit diagram showing an equivalent circuit of the current compensation unit.

The current compensation unit inverter (21) is connected to a power source system via the current compensation unit reactors (23) and the current compensation unit filters (24), and therefore, the circuit of the current compensation unit (20) can be represented by an equivalent circuit as shown in FIG. 10. In FIG. 10, "is" represents the power-source current (Is(uvw)), "ii" represents the load current (Io(uvw)), "Vs" represents the power-source voltage, "va" represents the output voltage (Va(uvw)) output from the current compensation unit inverter (21), "ia" represents the reactor current (ia(uvw)) flowing in the current compensation unit reactor (23), "La" represents the inductance of the current compensation unit reactor (23), "Lf" represents the inductance of the filter reactor (24a), "Cf" represents the capacitance of the filter capacitor (24b), "if" represents the current flowing in the filter reactor (24a), "ic" represents the current flowing in the filter capacitor (24b), and "vc" represents the voltage of the filter capacitor (24b). The transfer function Gp of "ia" for "va" is represented by Expression (V) below.

Math 1

$$Gp(s) = \frac{\Delta i_a(s)}{\Delta v_a(s)} = \frac{1/s\, C_f + sL_f}{sL_f/sC_f + sL_a/sC_f + sL_f \cdot sL_a} \quad (V)$$

As shown in Expression (V), when the inductance of the current compensation unit reactor (23) is greater than the inductance of the filter reactor (24a), the transfer function Gp has characteristics substantially inversely proportional to the inductance of the current compensation unit reactor (23).

Figure 11:
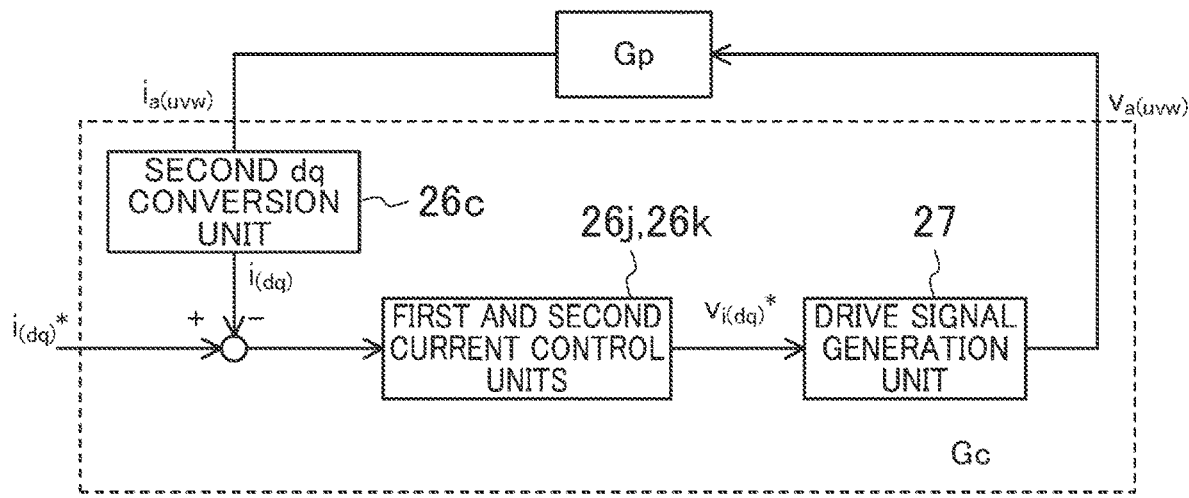
FIG. 11 is a block diagram showing a current control system included in the current compensation unit.

The compensation controller (26) performs, based on the detected reactor current (ia(uvw)), feedback control using the first and second current control units (26j, 26k) such that the current values (id, iq) calculated from the reactor current (ia(uvw)) are coincident with the command values (id*, iq*) obtained by extraction of the harmonic component from the load current (Io(uvw)). Assuming that the transfer function of the output voltage (Va(uvw)) output from the current compensation unit inverter (21) for the reactor current (ia(uvw)) is Gc, a current control system included in the current compensation unit (20) can be represented as shown in FIG. 11.

Figure 12A:
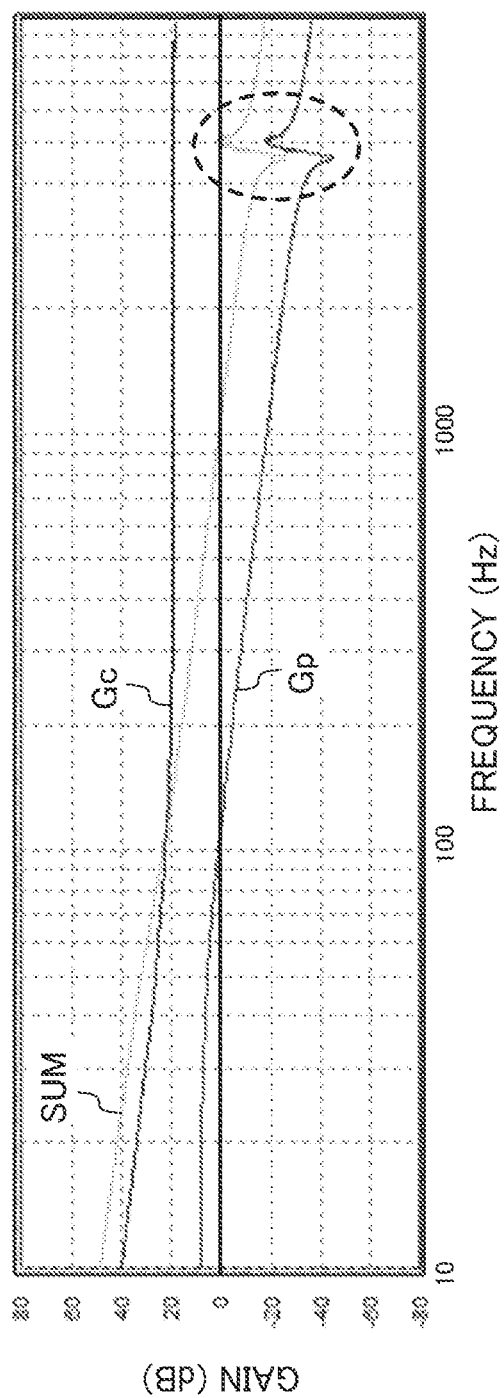
FIG. 12A shows a gain diagram of transfer functions Gp, Gc and the sum thereof.
Figure 12B:
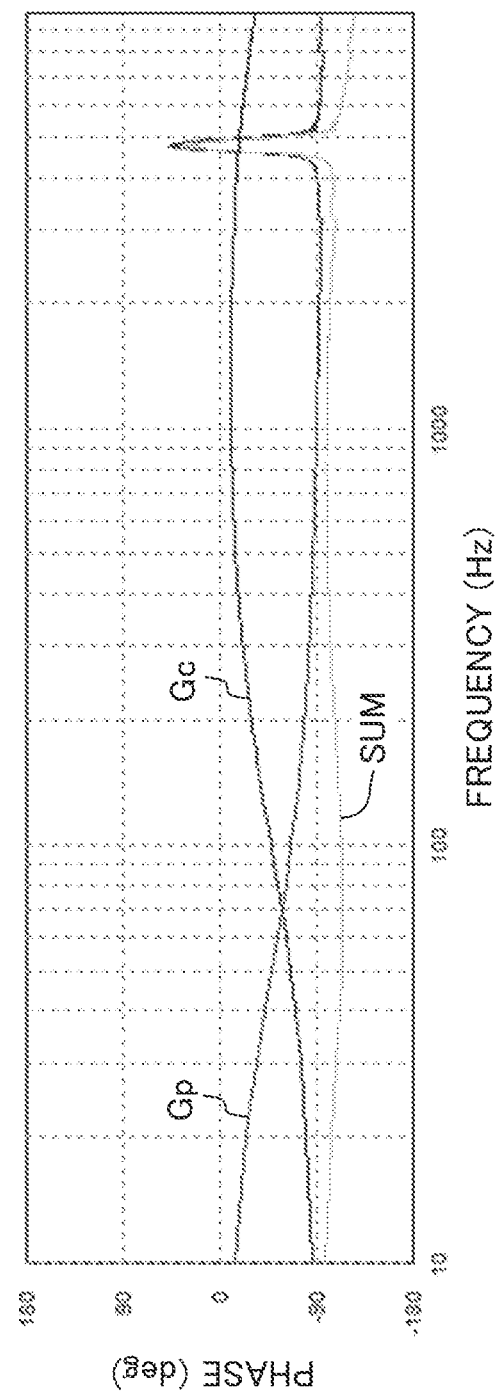
FIG. 12B shows a phase diagram of the transfer functions Gp, Gc and the sum thereof.

FIG. 12A shows a gain diagram of the transfer functions Gp, Gc and the sum thereof, and FIG. 12B shows a phase diagram of the transfer functions Gp, Gc and the sum thereof. If the gain characteristics of the first and second current control units (26j, 26k) are constant, the gain characteristics of the entire current compensation unit (20) change according to the inductance of the current compensation unit reactor (23). In FIG. 12A, resonance of the current compensation unit filter (24) occurs at a location surrounded by a dashed line.

In order to ensure the stability of the current control, flat direct-current superimposition characteristics of the current compensation unit reactor (23) are preferable. If the current control is set so that the stability thereof is ensured when the current flowing in the current compensation unit reactor (23) is at the peak current, control performance is degraded when the current is low, and such degraded control performance results in an increase of the harmonic component contained in the power-source current (Is(uvw)). The ratio of a peak current inductance to a zero current inductance is set to ⅓ or more, where the peak current inductance is the inductance of the current compensation unit reactor (23) when the current flowing in the current compensation unit reactor (23) is at the peak current, and the zero current inductance is the inductance of the current compensation unit reactor (23) when the current flowing in the current compensation unit reactor (23) is 0 A. In this manner, the stability of the current control can be ensured, and the harmonic current can be reduced.

In the first embodiment, the ratio of the peak current inductance to the zero current inductance is set to ⅓ or more.

Figure 13A:
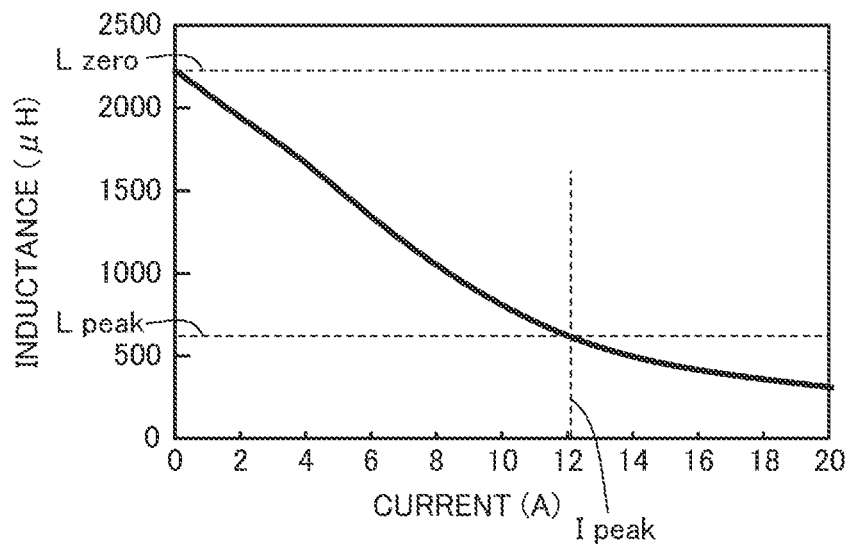
FIG. 13A is a graph showing direct-current superimposition characteristics of the current compensation unit reactor in a case where the ratio of a peak current inductance to a zero current inductance is less than ⅓.

In FIG. 13A, the peak current (Ipeak) is 12 A, the zero current inductance (Lzero) is 2.2 mH, and the peak current inductance (Lpeak) is 0.6 mH. Thus, the ratio of the peak current inductance (Lpeak) to the zero current inductance (Lzero) is less than ⅓.

Figure 13B:
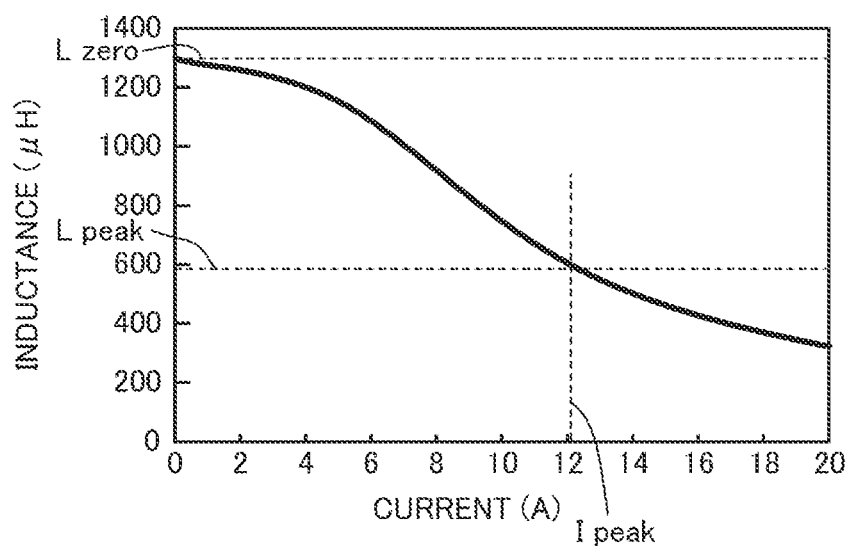
FIG. 13B is a graph corresponding to FIG. 13A, illustrating a case where the ratio of the peak current inductance to the zero current inductance is ⅓ or more.

In FIG. 13B, the peak current (Ipeak) is 12 A, the zero current inductance (Lzero) is 1.3 mH, and the peak current inductance (Lpeak) is 0.6 mH. Thus, the ratio of the peak current inductance (Lpeak) to the zero current inductance (Lzero) is ⅓ or more.

Also as shown in FIGS. 12A and 12B, the resonance frequency of the current compensation unit filter (24) is set to 4 kHz or higher, and therefore, influence of the resonance of the current compensation unit filter (24) on the compensating current (Ia(uvw)) can be reduced at a frequency lower than 4 kHz. Thus, in a case where the frequency of the three-phase alternating current is 50 Hz or 60 Hz, harmonic components in the power-source current (Is(uvw)) at the up to 40th orders can be surely reduced, and the compensating current (Ia(uvw)) can be stably controlled.

As shown in Expression (V) above, the inductance of the filter reactor (24a) is preferably set to be smaller than the inductance of the current compensation unit reactor (23).

In the first embodiment, the capacitance value of the power conversion unit capacitor (14) is set to be small enough to allow the fluctuation in the output voltage of the rectifier circuit (11), and therefore, the fluctuation range of the output current of the rectifier circuit (11) can be decreased and the peak value of the compensating current (Ia(uvw)) can be more suppressed as compared to a case where the capacitance value of the power conversion unit capacitor (14) is set to be great enough to absorb the fluctuation in the output voltage of the rectifier circuit (11).

Figure 14A:
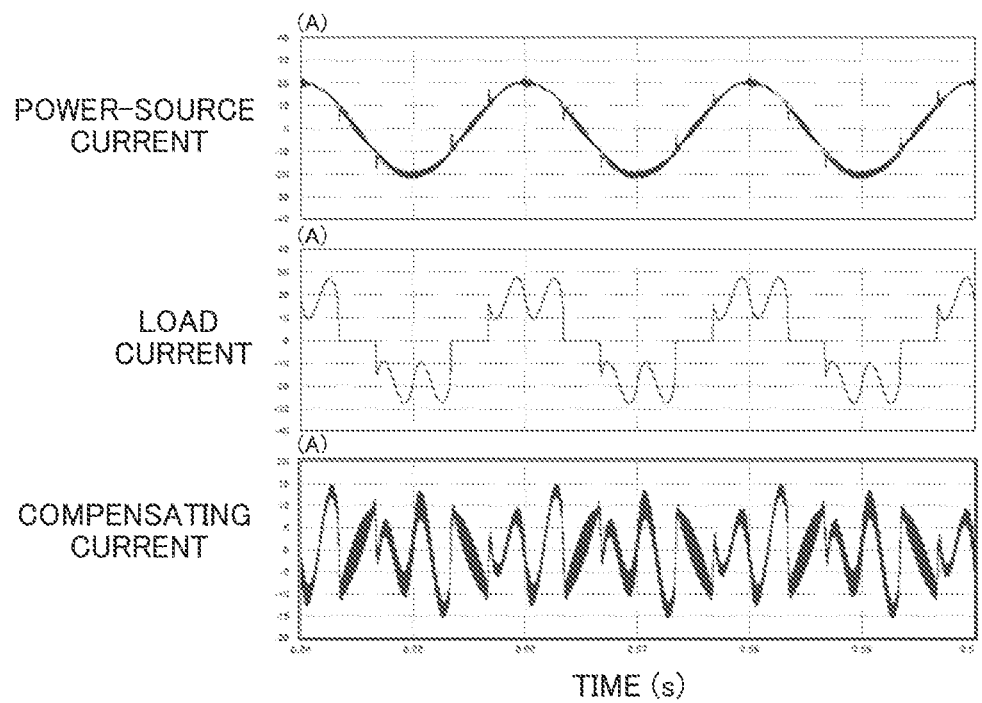
FIG. 14A is a timing chart of examples of the power-source current, the load current, and the compensating current in a case where the maximum input power of the power conversion unit is 10 kW and a capacitance value of a power conversion unit capacitor is set such that fluctuation in an output voltage of a rectifier circuit is absorbed with the capacitance.
Figure 14B:
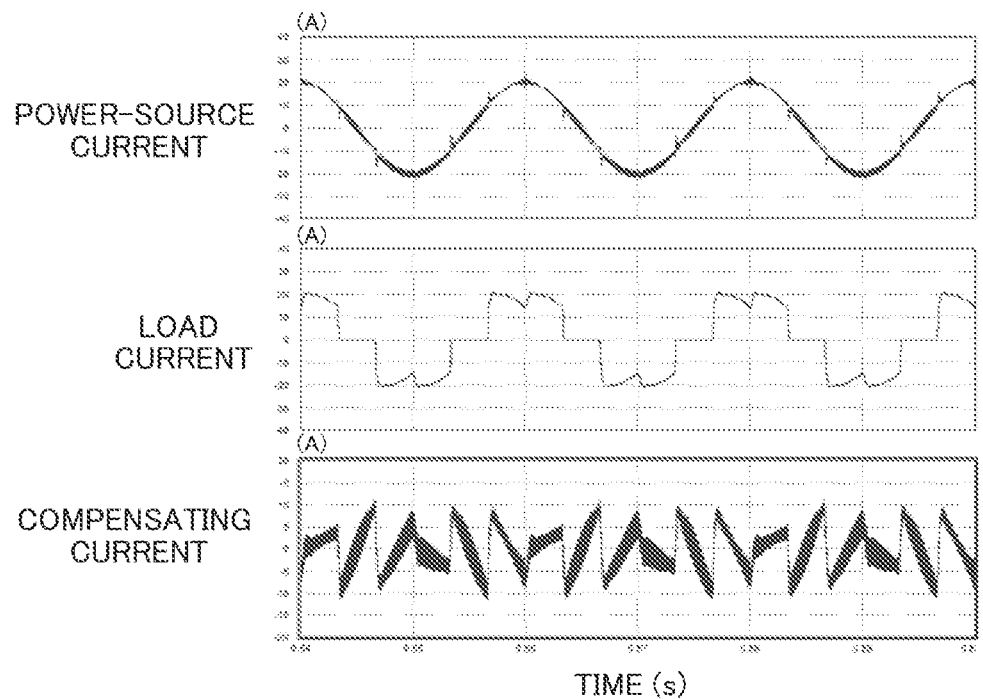
FIG. 14B is a timing chart corresponding to FIG. 14A, illustrating a case where the capacitance value of the power conversion unit capacitor is set such that the fluctuation in the output voltage of the rectifier circuit is allowed.

FIG. 14A shows, as an example, the power-source current (Is(uvw)), the load current (Io(uvw)), and the compensating current (Ia(uvw)) in a case where the maximum input power of the power conversion unit (10) is 10 kW and the capacitance value of the power conversion unit capacitor (14) is set such that the fluctuation in the output voltage of the rectifier circuit (11) is absorbed, i.e., a so-called capacitor input type is employed. FIG. 14B is a timing chart corresponding to FIG. 14A, illustrating a case where the maximum input power of the power conversion unit (10) is 10 kW and the capacitance value of the power conversion unit capacitor (14) is set such that the fluctuation in the output voltage of the rectifier circuit (11) is allowed.

In FIG. 14A, the effective value of the compensating current (Ia(uvw)) is 6.8 A, and the peak value of the compensating current (Ia(uvw)) is 15.3 A. On the other hand, in FIG. 14B, the effective value of the compensating current (Ia(uvw)) is 4.5 A, and the peak value of the compensating current (Ia(uvw)) is 11.0 A. That is, the effective value and peak value of the compensating current (Ia(uvw)) can be suppressed to ⅔ of the case of FIG. 14A.

As compared to a case where the capacitance of the current compensation unit capacitor (22) is equal to or less than the capacitance of the power conversion unit capacitor (14), ripple of the direct-current voltage (Vdc) between the direct-current-side nodes (21a, 21b) of the current compensation unit inverter (21) can be more suppressed, so that the harmonic component contained in the power-source current (Is(uvw)) can be more surely reduced.

Figure 15A:
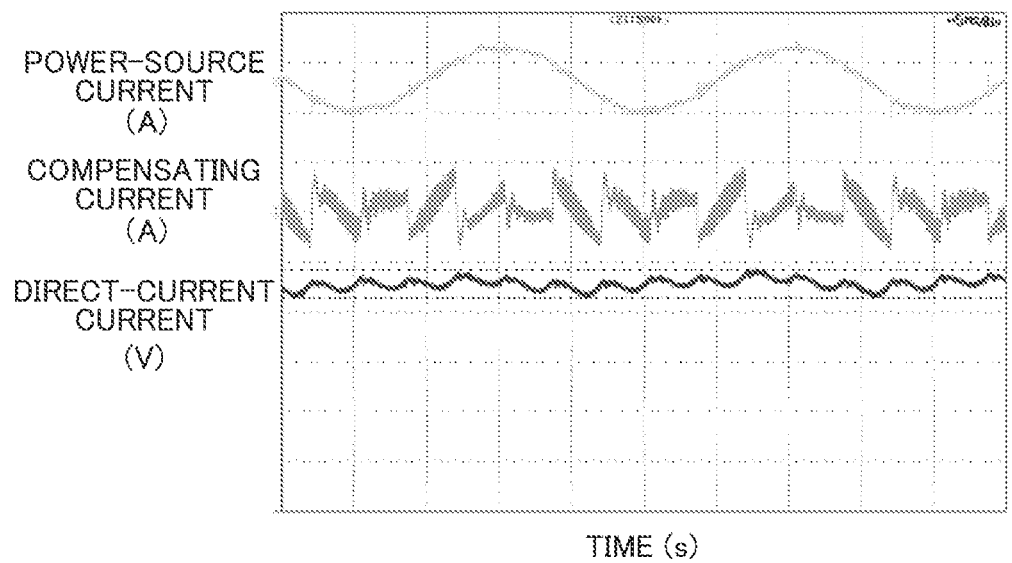
FIG. 15A is a timing chart showing, as an example, the power-source current, the compensating current, and a direct-current voltage in a case where the capacitance of a current compensation unit capacitor is 195 μF and the capacitance of the power conversion unit capacitor is 30 μF.
Figure 15B:
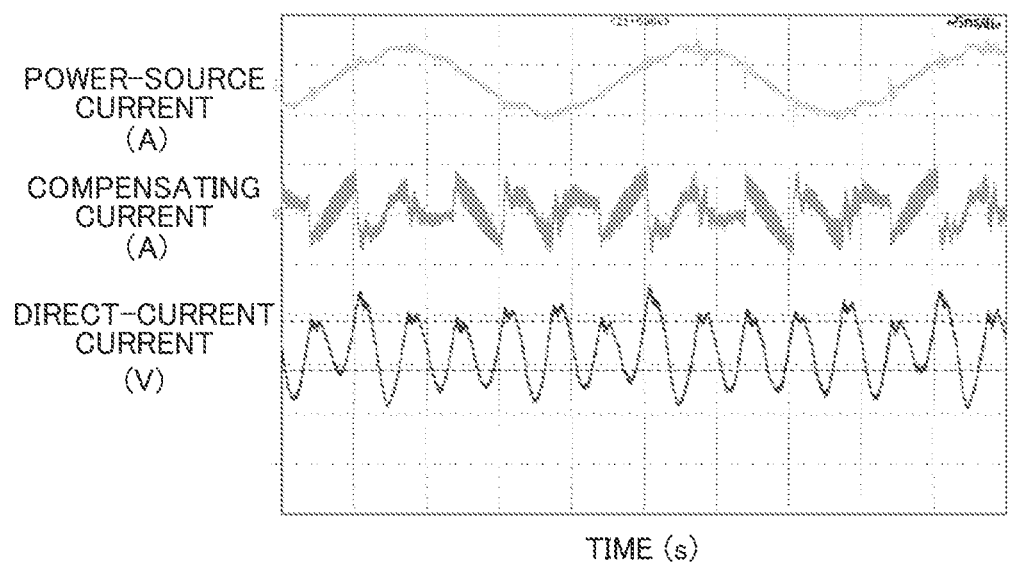
FIG. 15B is a timing chart corresponding to FIG. 15A, illustrating a case where the capacitance of the current compensation unit capacitor is 15 μF and the capacitance of the power conversion unit capacitor is 30 μF.

FIG. 15A shows, as an example, the power-source current (Is(uvw)), the compensating current (Ia(uvw)), and the direct-current voltage (Vdc) in a case where the capacitance of the current compensation unit capacitor (22) is 195 μF and the capacitance of the power conversion unit capacitor (14) is 30 μF. FIG. 15B is a timing chart corresponding to FIG. 15A, illustrating a case where the capacitance of the current compensation unit capacitor (22) is 15 μF and the capacitance of the power conversion unit capacitor (14) is 30 μF.

In FIG. 15B, the fluctuation range of the direct-current voltage (Vdc) is greater and distortion of the power-source current (Is(uvw)) is greater than those in FIG. 15A.

In the first embodiment, the synchronous rectification operation is performed using the unipolar transistors as the switching elements (Sr1, Sr2, Ss1, Ss2, St1, St2) of the current compensation unit inverter (21), and therefore, a conduction voltage generated when any of the switching elements (Sr1, Sr2, Ss1, Ss2, St1, St2) is turned ON can be decreased as compared to a case where the bipolar transistors are used as the switching elements (Sr1, Sr2, Ss1, Ss2, St1, St2). Thus, an error in the output voltage (Va(uvw)) output from the current compensation unit inverter (21) due to the conduction voltage can be suppressed, so that the harmonic component contained in the power-source current (Is(uvw)) can be more surely reduced.

Figure 16:
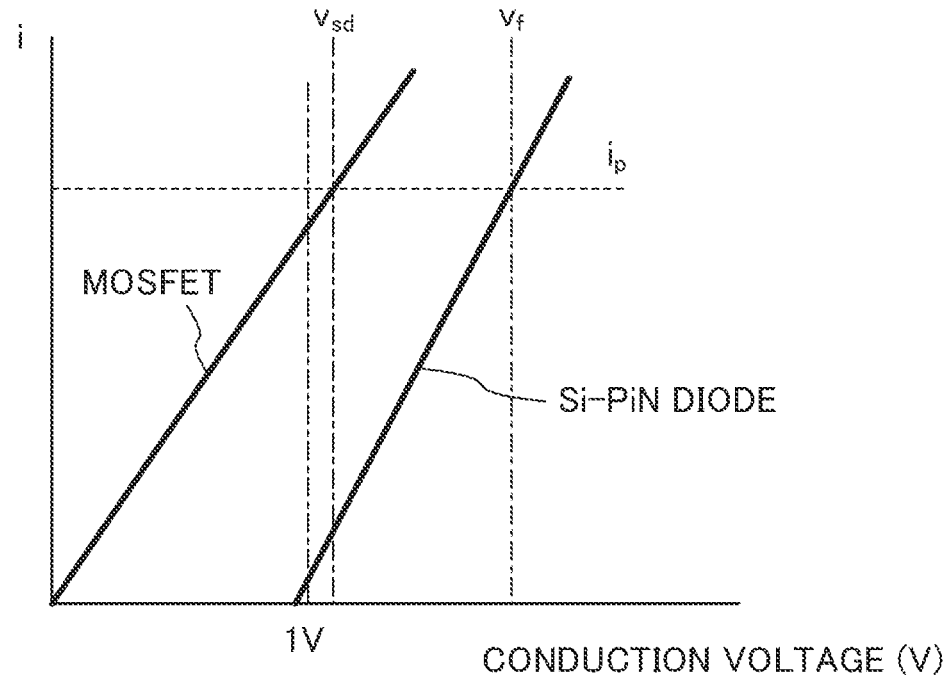
FIG. 16 is a graph showing a relationship between a conduction voltage and a current flowing in a freewheeling diode in a case where a Si-PiN diode is provided as the freewheeling diode in antiparallel with a switching element, or a current flowing in the opposite direction in the switching element in a case where the switching element is a MOSFET.

FIG. 16 is a graph showing a relationship between the conduction voltage and the current flowing in the freewheeling diode in a case where a silicon p-intrinsic-n (Si-PiN) diode is provided as the freewheeling diode in antiparallel with the switching element (Sr1, Sr2, Ss1, Ss2, St1, St2), or the current flowing in the opposite direction in the switching element (Sr1, Sr2, Ss1, Ss2, St1, St2) in a case where the switching element (Sr1, Sr2, Ss1, Ss2, St1, St2) is a MOSFET.

Here, it is assumed that the peak value of the current flowing in the switching element (Sr1, Sr2, Ss1, Ss2, St1, St2) is 12 A (indicated by reference characters ip in FIG. 16), Vf represents a conduction voltage of a general diode, and Vsd represents the conduction voltage of the MOSFET. While Vf is 1.8 V, Vsd is 1.1 V as shown in Expression (VI) below, assuming that the on-resistance is 100 mΩ.

$$Vsd=11\ A*0.1\Omega=1.1\ V \quad (VI)$$

Thus, according to the first embodiment, the drive signal generator (27) generates the drive signal (Sd) such that Expressions (II) to (IV) above are satisfied, and therefore, the harmonic component contained in the power-source current (Is(uvw)) can be effectively reduced. Thus, it is easy to make the power-source current (Is(uvw)) meet IEC61000-3-2.

The ratio of the peak current inductance (Lpeak) to the zero current inductance (Lzero) is set to ⅓ or more, and therefore, the harmonic component contained in the power-source current (Is(uvw)) can be more surely reduced and the compensating current (Ia(uvw)) can be stably controlled as compared to a case where the ratio is set to less than ⅓.

The switching element (Sr1, Sr2, Ss1, Ss2, St1, St2) is the element made of the wide bandgap semiconductor material as the main material, and the on-resistance of the switching element (Sr1, Sr2, Ss1, Ss2, St1, St2) is 100 mΩ or less. Thus, it is easy to increase the switching speed of the switching element (Sr1, Sr2, Ss1, Ss2, St1, St2) and shorten the dead time. Accordingly, it is easy to reduce the harmonic component contained in the power-source current (Is(uvw)).

The second carrier frequency is set to 100 kHz or less, and therefore, the dead time can be kept longer than that in a case where the second carrier frequency is set higher than 100 kHz.

Second Embodiment

In a second embodiment, a drive signal generator (27) generates a drive signal (Sd) by a two-phase modulation method based on output voltage command values (Vid, Viq) such that a current compensation unit inverter (21) performs synchronous rectification operation. The second embodiment is the same as, or similar to the first embodiment apart from the difference mentioned above.

Figure 17:
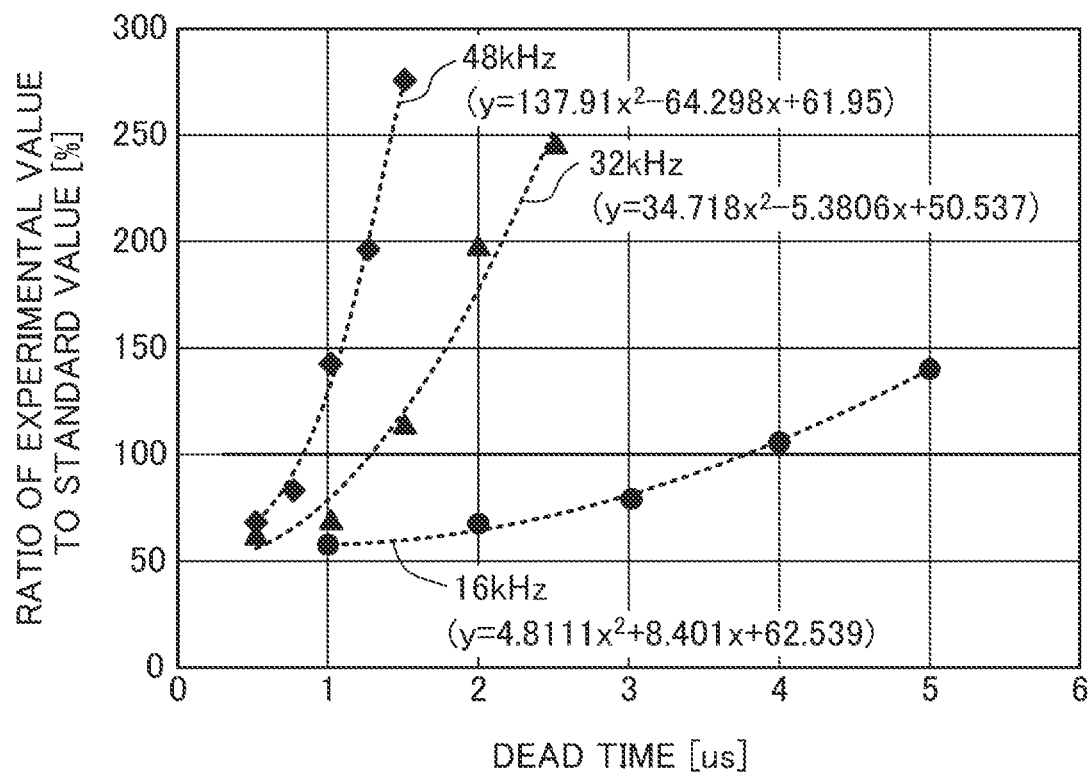
FIG. 17 is a graph corresponding to FIG. 4, illustrating a case where the two-phase modulation method is employed.

In a case where the two-phase modulation method is employed for generation of the drive signal (Sd), a relationship between a dead time for the drive signal (Sd) and the ratio (the ratio of an experimental value to a standard value) of the amount of a harmonic component contained in a power-source current (Is(uvw)) in the experiment to the upper limit for harmonic current emissions as specified in IEC61000-3-2 is as shown in FIG. 17. FIG. 17 shows cases where a second carrier frequency is 16 kHz, 32 kHz, and 48 kHz. Based on the relationship shown in FIG. 17, it is estimated that, for a greater second carrier frequency, the dead time needs to be shorter in order for the power-source current (Is(uvw)) to meet the standard.

FIG. 18 shows a current value of the harmonic component contained in the power-source current (Is(uvw)) in a case where the two-phase modulation method is employed, the second carrier frequency is 48 kHz, the maximum input power of a power conversion unit (10) is 10 kW, and the dead time is 0.5 μsec and 1.0 μsec. In the case where the dead time is 1.0 μsec, the harmonic components at the 8th, 34th, 35th, and 40th orders exceed the upper limit for harmonic current emissions as specified in IEC61000-3-2. In the case where the dead time is 0.5 μsec, the harmonic components at all the orders fall below the upper limit for harmonic current emissions as specified in IEC61000-3-2.

Figure 19A:
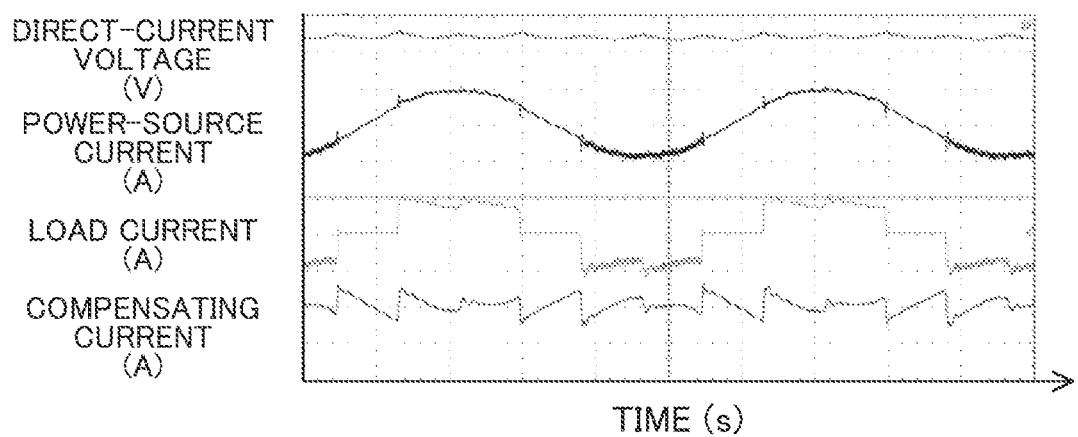
FIG. 19A is a timing chart showing the direct-current voltage, the power-source current, the load current, and the compensating current in a case where the second carrier frequency is 48 kHz, the maximum input power of the power conversion unit is 10 kW, and the dead time is 0.5 μsec.
Figure 19B:
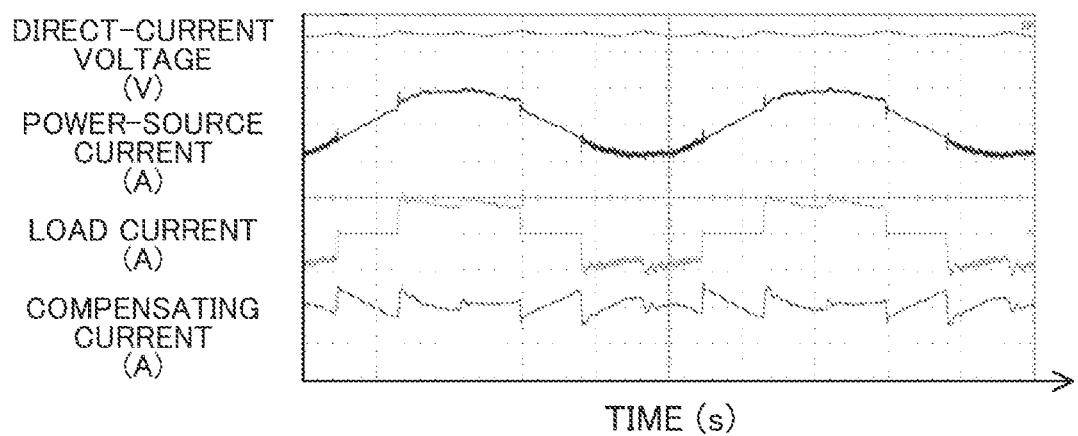
FIG. 19B is a timing chart corresponding to FIG. 19A, illustrating a case where the dead time is 1.0 μsec.

FIG. 19A shows a direct-current voltage (Vdc), the power-source current (Is(uvw)), a load current (Io(uvw)), and a compensating current (Ia(uvw)) in a case where the second carrier frequency is 48 kHz, the maximum input power of the power conversion unit (10) is 10 kW, and the dead time is 0.5 μsec. FIG. 19B is a timing chart corresponding to FIG. 19A, illustrating a case where the second carrier frequency is 48 kHz, the maximum input power of the power conversion unit (10) is 10 kW, and the dead time is 1.0 μsec. As described above, in FIG. 19A, the harmonic component contained in the power-source current (Is(uvw)) is reduced as compared to FIG. 19B.

Based on the information shown in FIGS. 6, 7, and 17 to 19, the inventors have found that by setting the dead time for the drive signal (Sd) such that Expression (VII) below is satisfied, the harmonic component contained in the power-source current (Is(uvw)) can be effectively reduced and the power-source current (Is(uvw)) can easily meet IEC61000-3-2.

Hereinafter, in Expression (VII) below, fsw (kHz) represents the second carrier frequency, Pmax (kW) represents the maximum input power of the power conversion unit (10), and Td (μs) represents the dead time for the drive signal (Sd).

$$Td \leq (45.23/fsw - 0.135)(1.48 - 0.048 \cdot Pmax) \quad \text{(VII)}$$

In the second embodiment, the drive signal generator (27) generates the drive signal (Sd) such that Expression (VII) below is satisfied.

In the second embodiment, the drive signal generator (27) generates the drive signal (Sd) such that not only Expression (VII) but also Expressions (VIII) and (IX) below are satisfied.

In Expressions (VIII) and (IX), fsw (kHz) represents the second carrier frequency, Pmax (kW) represents the maximum input power of the power conversion unit (10), Td (μs) represents the dead time for the drive signal, and Lac (mH) represents the inductance of a current compensation unit reactor (23) when the current flowing in the current compensation unit reactor (23) is 0 A.

$$Lac \leq 16/Pmax \quad \text{(VIII)}$$

$$Td \leq (45.23/fsw - 0.135) \quad \text{(IX)}$$

Figure 20:
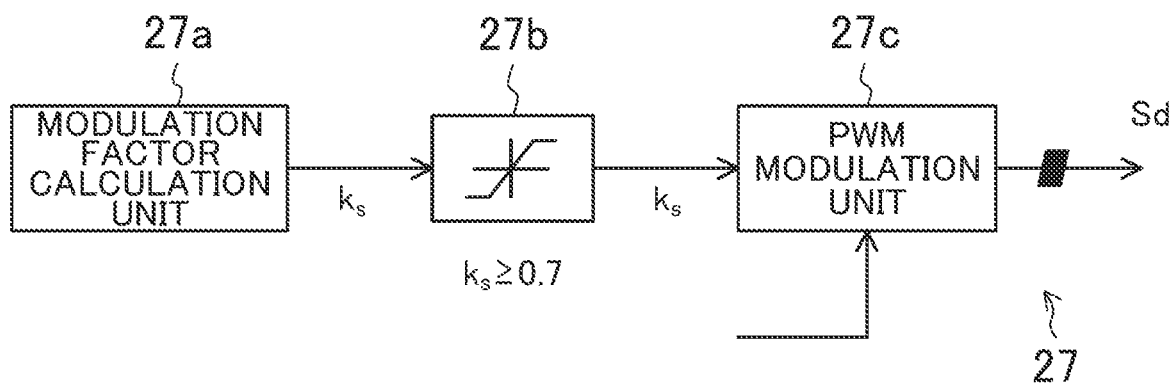
FIG. 20 is a block diagram showing a configuration of a drive signal generator according to a second embodiment.

In the second embodiment, the drive signal generator (27) generates the drive signal (Sd) based on the output voltage command values (Vid, Viq) such that the percentage of the amplitude of an alternating-current-side line voltage with respect to the direct-current voltage (Vdc) is 70% or more. More specifically, as shown in FIG. 20, the drive signal generator (27) includes a modulation factor calculation unit (27a), a limiter (27b), and a PWM modulation unit (27c).

The modulation factor calculation unit (27a) calculates a phase (ψ) and a modulation factor (ks) based on the output voltage command values (Vid, Viq) generated by first and second current control units (26j, 26k). The modulation factor (ks) means the percentage of the amplitude (the maximum value) of the alternating-current-side line voltage with respect to the direct-current voltage (Vdc).

Assuming that w represents the value of phase (ψ) and Vid and Viq represent the output voltage command values (Vid, Viq), ψ can be calculated according to Expression (X) below.

$$\Psi = \tan^{-1}(Viq/Vid) \quad \text{(X)}$$

Assuming that ks represents the modulation factor (ks), ks can be calculated based on Expressions (XI) and (XII) below. Here, Vi is the effective value of the alternating-current-side line voltage of the current compensation unit inverter (21).

$$Vi = Vid/\cos \psi \quad \text{(XI)}$$

Math 2

$$ks = \sqrt{2} \cdot Vi/Vdc \quad \text{(VII)}$$

In a case where the modulation factor (ks) calculated by the modulation factor calculation unit (27a) is 0.7 or more, the limiter (27b) outputs the modulation factor (ks) calculated by the modulation factor calculation unit (27a). In a case where the modulation factor (ks) falls below 0.7, the limiter (27b) outputs 0.7 as the modulation factor (ks).

The PWM modulation unit (27c) generates the drive signal (Sd) based on the phase (ψ) and the modulation factor (ks) output from the limiter (27b). A second carrier wave is used for generation of the drive signal (Sd) by the PWM modulation unit (27c). A frequency of 100 Hz or less is employed as the second carrier frequency, which is the carrier frequency of the second carrier wave.

In the second embodiment, the modulation factor (ks) is 70% or more, and therefore, a rapid change in the duty ratio of a switching element (Sr1, Sr2, Ss1, Ss2, St1, St2) of the current compensation unit inverter (21) upon phase switching of a modulation target can be suppressed as compared to a case where the modulation factor (ks) is less than 70%. Accordingly, the harmonic component contained in the power-source current (Is(uvw)) can be more surely reduced.

Figure 21A:
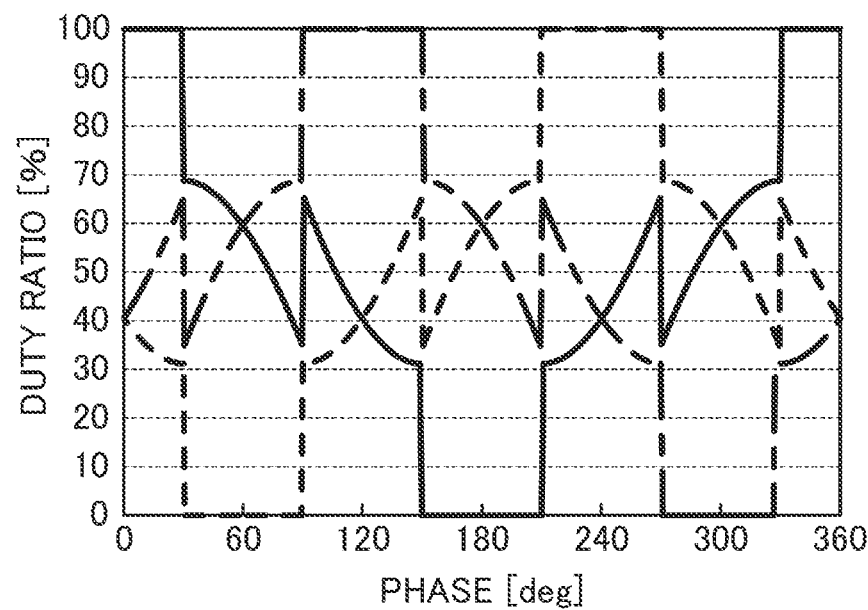
FIG. 21A is a graph showing a relationship among the duty ratios and phases of three switching elements of an upper arm of the current compensation unit inverter in a case where a modulation factor is 40%.
Figure 21B:
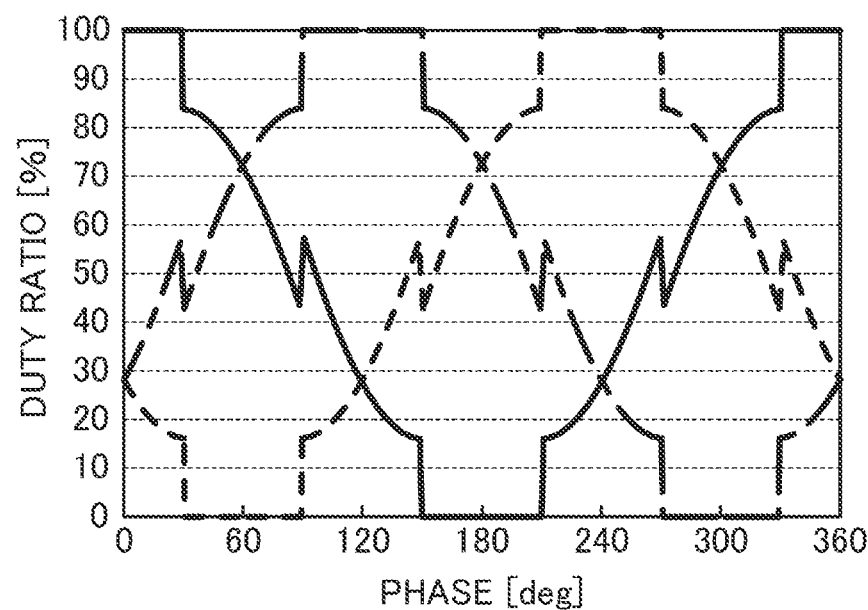
FIG. 21B is a graph corresponding to FIG. 21A, illustrating a case where the modulation factor is 70%.

FIG. 21A shows a relationship among the duty ratios and phases of three switching elements (Sr1, Ss1, Sr1) of an upper arm of the current compensation unit inverter (21) in a case where the modulation factor (ks) is 40%. FIG. 21B is a graph corresponding to FIG. 21A and showing a case where the modulation factor (ks) is 70%. In the case where the modulation factor (ks) is 70%, a change in the duty ratio of the switching element (Sr1, Ss1, St1) of the current compensation unit inverter (21) upon phase switching of the modulation target is smaller as compared to the case where the modulation factor (ks) is 40%.

Thus, according to the second embodiment, the drive signal generator (27) generates the drive signal (Sd) such that Expressions (VII) to (IX) above are satisfied, and therefore, the harmonic component contained in the power-source current (Is(uvw)) can be effectively reduced. Thus, it is easy to make the power-source current (Is(uvw)) meet IEC61000-3-2.

Third Embodiment

Figure 22:
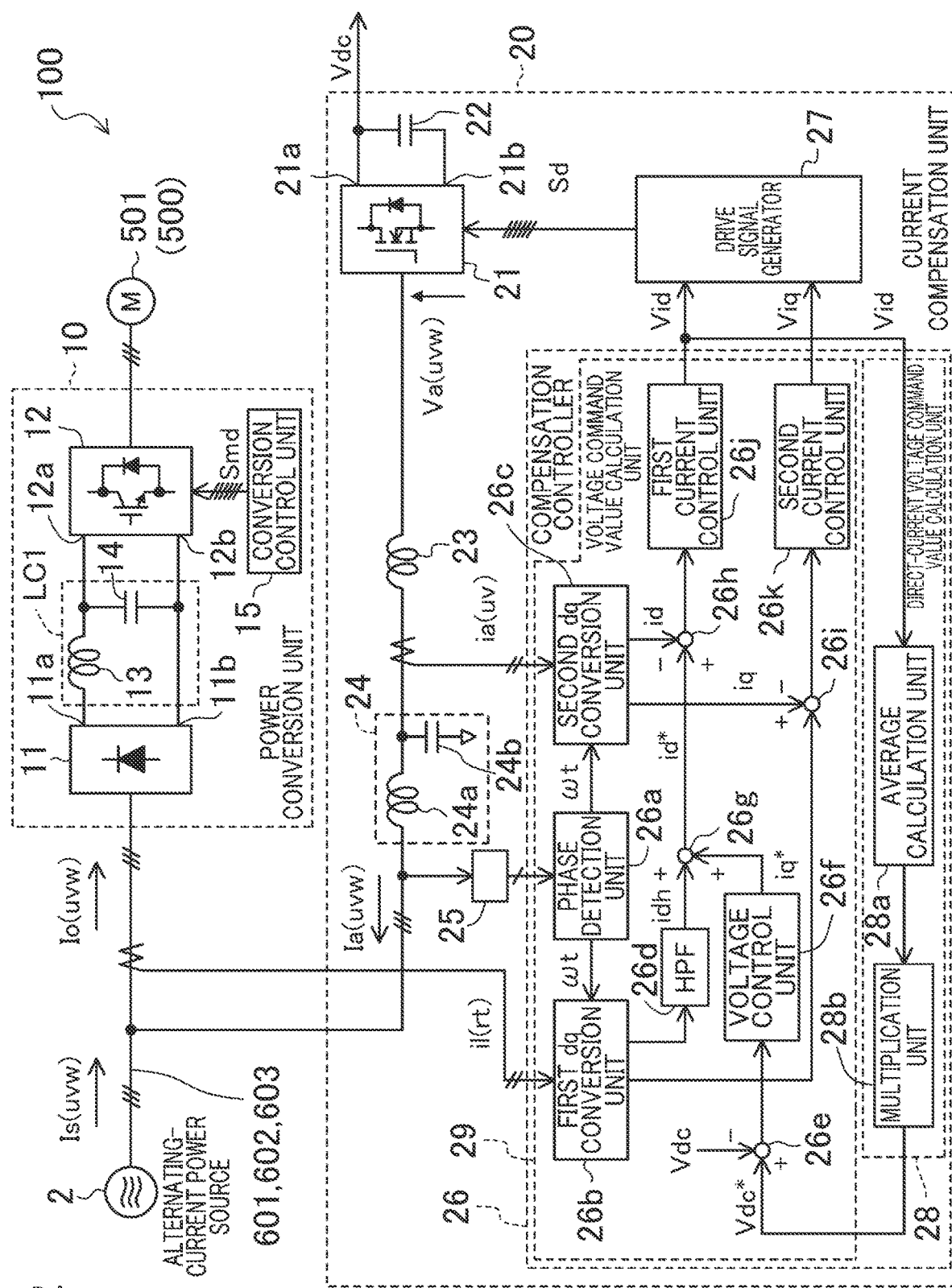
FIG. 22 is a diagram corresponding to FIG. 2, illustrating a third embodiment.

FIG. 22 shows a power converter (100) according to a third embodiment of the present disclosure.

In the third embodiment, a drive signal generator (27) does not include a limiter (27b), and a PWM modulation unit (27c) generates a drive signal (Sd) based on a modulation factor (ks) output from a modulation factor calculation unit (27a).

A compensation controller (26) further includes a direct-current voltage command value calculation unit (28).

The direct-current voltage command value calculation unit (28) calculates a direct-current voltage command value (Vdc*) based on an output voltage command value (Vid) for a d-axis component such that the direct-current voltage command value (Vdc*) is equal to or less than the double of an average alternating-current-side line voltage of a current compensation unit inverter (21). More specifically, the direct-current voltage command value calculation unit (28) has an average calculation unit (28a) and a multiplication unit (28b).

The average calculation unit (28a) calculates the average output voltage command value (Vid) for the d-axis component.

The multiplication unit (28b) multiplies the average calculated by the average calculation unit (28a) by a predetermined gain ($K_{VI}$), thereby calculating the direct-current voltage command value (Vdc*). The predetermined gain ($K_{VI}$) is set to 2 or less.

A phase detection unit (26a), first and second dq conversion units (26b, 26c), a high-pass filter (26d), a first subtraction unit (26e), a voltage control unit (26f), a first addition unit (26g), second and third subtraction units (26h, 26i), and first and second current control units (26j, 26k) of the compensation controller (26) form a voltage command value calculation unit (29) that calculates the output voltage command values (Vid, Viq) based on a direct-current voltage (Vdc) and the direct-current voltage command value (Vdc*).

The direct-current voltage command value calculation unit (28) may calculate the direct-current voltage command value (Vdc*) based on the effective value of the alternating-current-side line voltage of the current compensation unit inverter (21) such that the direct-current voltage command value (Vdc*) is equal to or less than the double of the average alternating-current-side line voltage of a current compensation unit inverter (21). A relationship between the effective value of the alternating-current-side line voltage of the current compensation unit inverter (21) and the output voltage command value (Vid) for the d-axis component is as shown in Expression (XI) above.

The third embodiment is the same as, or similar to those of the second embodiment apart from the difference mentioned above. Thus, the like reference characters are labeled to the like components, and their detailed description will not be repeated herein.

Thus, according to the third embodiment, the direct-current voltage command value (Vdc*) is calculated such that the direct-current voltage command value (Vdc*) is equal to or less than the double of the average alternating-current-side line voltage of the current compensation unit inverter (21), and therefore, the percentage of the amplitude of the alternating-current-side line voltage with respect to the direct-current voltage (Vdc) becomes 70% or more. Thus, as compared to a case where the direct-current voltage command value (Vdc*) is higher than the double of the average alternating-current-side line voltage of the current compensation unit inverter (21), a rapid change in the duty ratio of the switching element (Sr1, Sr2, Ss1, Ss2, St1, St2) of the current compensation unit inverter (21) upon phase switching of the modulation target can be more suppressed, and the harmonic component contained in the power-source current (Is(uvw)) can be more surely reduced.

Other Variations

In the first to third embodiments, the harmonic generation source is connected to the first and second conductive wires (601, 602) of the first to third conductive wires (601, 602, 603), but may be connected to only one of the first to third conductive wires (601, 602, 603) or be connected to all three conductive wires.

In the third embodiment, the direct-current voltage command value calculation unit (28) calculates the direct-current voltage command value (Vdc*) such that the direct-current voltage command value (Vdc*) is equal to or less than the double of the average alternating-current-side line voltage of the current compensation unit inverter (21), but the direct-current voltage command value calculation unit (28) may calculate the direct-current voltage command value (Vdc*) such that the direct-current voltage command value (Vdc*) is equal to or less than the double of a fundamental frequency component of the alternating-current-side line voltage of the current compensation unit inverter (21). That is, the average calculation unit (28a) may calculate a fundamental frequency component of the output voltage command value (Vid) for the d-axis component.

In the first embodiment, the drive signal generator (27) generates the drive signal (Sd) such that Expressions (II) to (IV) are satisfied, but the drive signal generator (27) may generate the drive signal (Sd) such that not Expression (II) but only Expressions (III) and (IV) are satisfied. The drive signal generator (27) may generate the drive signal (Sd) such that one or both of Expressions (III) and (IV) are not satisfied and Expression (II) is satisfied.

In the second embodiment, the drive signal generator (27) generates the drive signal (Sd) such that Expressions (VII) to (IX) are satisfied, but the drive signal generator (27) may generate the drive signal (Sd) such that not Expression (VII) but only Expressions (VIII) and (IX) are satisfied. The drive signal generator (27) may generate the drive signal (Sd) such that one or both of Expressions (VIII) and (IX) are not satisfied and Expression (VII) is satisfied.

In the first to third embodiments, the power converter (100) is provided in the air-conditioning system (1), but the power converter (100) may be provided in a heat pump system of another type such as ones for adjusting a temperature, a humidity, etc. More specifically, the power converter (100) may be provided in heat pump systems of an air/water-heating system, a showcase, a refrigerator, a freezer, and a water heater for conditioning an internal temperature, etc.

As described above, the present disclosure is usefully applicable to a power converter including a power conversion unit that performs power conversion for the three-phase alternating current output from an alternating-current power source and a current compensation unit that supplies the compensating current to the alternating-current power source, and to a heat pump system including such a power converter.

The invention claimed is:

1. A power converter comprising:
a power conversion unit that performs power conversion for a three-phase alternating current output from an alternating-current power source; and
a current compensation unit that supplies a compensating current to the alternating-current power source, the current compensation unit including
a current compensation unit inverter including a plurality of switching elements,
a current compensation unit capacitor connected between direct-current-side nodes of the current compensation unit inverter, a current compensation unit reactor connected between the alternating current side of the current compensation unit inverter and the alternating-current power source, a compensation controller that obtains an output voltage command value such that a harmonic component contained in a power-source current supplied to the power converter from the alternating-current power source is reduced by the compensating current, and a drive signal generator that generates, based on the output voltage command value, a drive signal usable to drive the switching elements by a three-phase modulation method, the current compensation unit inverter supplying, by switching operation of the switching elements, the compensating current to the alternating-current power source via the current compensation unit reactor, and $Td \leq (34.00/fsw - 0.145)(1.55 - 0.055 * Pmax)$, where fsw represents a carrier frequency employed for generation of the drive signal, Pmax represents a maximum input power of the power conversion unit, and Td represents a dead time for the drive signal.

2. The power converter according to claim 1, further comprising:

a filter interposed between the alternating-current power source and the current compensation unit reactor, the filter including a filter reactor with a smaller inductance than the current compensation unit reactor, and a filter capacitor, the filter having a resonance frequency of 4 kHz or higher.

3. A power converter comprising:

a power conversion unit that performs power conversion for a three-phase alternating current output from an alternating-current power source; and a current compensation unit that supplies a compensating current to the alternating-current power source, the current compensation unit including a current compensation unit inverter including a plurality of switching elements, a current compensation unit capacitor connected between direct-current-side nodes of the current compensation unit inverter, a current compensation unit reactor connected between the alternating current side of the current compensation unit inverter and the alternating-current power source, a compensation controller that obtains an output voltage command value such that a harmonic component contained in a power-source current supplied to the power converter from the alternating-current power source is reduced by the compensating current, and a drive signal generator that generates, based on the output voltage command value, a drive signal usable to drive the switching elements by a two-phase modulation method, the current compensation unit inverter supplying, by switching operation of the switching elements, the compensating current to the alternating-current power source via the current compensation unit reactor, and $Td \leq (45.23/fsw - 0.135)(1.48 - 0.048 * Pmax)$, where fsw represents a carrier frequency employed for generation of the drive signal, Pmax represents a maximum input power of the power conversion unit, and Td represents a dead time for the drive signal.

4. The power converter according to claim 3, wherein the drive signal generator generates the drive signal based on the output voltage command value such that a percentage of an amplitude of an alternating-current-side line voltage with respect to a direct-current voltage between the direct-current-side nodes of the current compensation unit inverter is 70% or more.

5. The power converter according to claim 3, wherein the compensation controller includes a voltage command value calculation unit that calculates the output voltage command value based on the direct-current voltage between the direct-current-side nodes of the current compensation unit inverter and on a direct-current voltage command value, and a direct-current voltage command value calculation unit calculates the direct-current voltage command value based on the output voltage command value such that the direct-current voltage command value is equal to or less than the double of an average alternating-current-side line voltage of the current compensation unit inverter or of a fundamental frequency component of the alternating-current-side line voltage of the current compensation unit inverter.

6. The power converter according to claim 3, wherein the power conversion unit includes a rectifier circuit that rectifies the three-phase alternating current into a direct current, a power conversion unit inverter that converts the direct current into an alternating current, a power conversion unit capacitor connected between direct-current-side nodes of the power conversion unit inverter and configured to allow for fluctuation in an output voltage of the rectifier circuit, and a power conversion unit reactor connected between the alternating-current power source and one end of the power conversion unit capacitor.

7. The power converter according to claim 6, wherein a capacitance of the current compensation unit capacitor is greater than a capacitance of the power conversion unit capacitor.

8. The power converter according to claim 3, wherein the current compensation unit inverter includes, as the switching elements, six unipolar transistors forming three legs, and the drive signal generator generates the drive signal so as to cause the current compensation unit inverter to perform synchronous rectification operation.

9. The power converter according to claim 8, wherein the switching elements are elements made of a wide bandgap semiconductor material as a main material, and an on-resistance of each switching element is 100 mΩ or less.

10. The power converter according to claim 9, wherein the carrier frequency is 100 kHz or less.

11. A heat pump system including the power converter according to claim 3, further comprising:

a harmonic generation source, the power conversion unit receiving the input of the three-phase alternating current via three conductive wires, and the harmonic generation source generating a harmonic in a current in at least one of the three conductive wires.

12. The power converter according to claim 3, further comprising:
a filter interposed between the alternating-current power source and the current compensation unit reactor, the filter including
a filter reactor with a smaller inductance than the current compensation unit reactor, and
a filter capacitor,
the filter having a resonance frequency of 4 kHz or higher.

13. A power converter comprising:
a power conversion unit that performs power conversion for a three-phase alternating current output from an alternating-current power source; and
a current compensation unit that supplies a compensating current to the alternating-current power source, the current compensation unit including
a current compensation unit inverter including a plurality of switching elements,
a current compensation unit capacitor connected between direct-current-side nodes of the current compensation unit inverter,
a current compensation unit reactor connected between the alternating current side of the current compensation unit inverter and the alternating-current power source,
a compensation controller that obtains an output voltage command value such that a harmonic component contained in a power-source current supplied to the power converter from the alternating-current power source is reduced by the compensating current, and
a drive signal generator that generates, based on the output voltage command value, a drive signal usable to drive the switching elements by a three-phase modulation method,
the current compensation unit inverter supplying, by switching operation of the switching elements, the compensating current to the alternating-current power source via the current compensation unit reactor, $Lac \leq 16/Pmax$, and $Td \leq (34.00/fsw - 0.145)$, where fsw represents a carrier frequency employed for generation of the drive signal,
Pmax represents a maximum input power of the power conversion unit,
Td represents a dead time for the drive signal, and
Lac represents an inductance of the current compensation unit reactor when the current flowing in the current compensation unit reactor is 0 A.

14. The power converter according to claim 13, wherein a ratio of
an inductance of the current compensation unit reactor when the current flowing in the current compensation unit reactor is at a peak current to
an inductance of the current compensation unit reactor when the current flowing in the current compensation unit reactor is 0 A
is set to ⅓ or more.

15. The power converter according to claim 13, further comprising:
a filter interposed between the alternating-current power source and the current compensation unit reactor, the filter including
a filter reactor with a smaller inductance than the current compensation unit reactor, and
a filter capacitor,
the filter having a resonance frequency of 4 kHz or higher.

16. A power converter comprising:
a power conversion unit that performs power conversion for a three-phase alternating current output from an alternating-current power source; and
a current compensation unit that supplies a compensating current to the alternating-current power source, the current compensation unit including
a current compensation unit inverter including a plurality of switching elements,
a current compensation unit capacitor connected between direct-current-side nodes of the current compensation unit inverter,
a current compensation unit reactor connected between the alternating current side of the current compensation unit inverter and the alternating-current power source,
a compensation controller that obtains an output voltage command value such that a harmonic component contained in a power-source current supplied to the power converter from the alternating-current power source is reduced by the compensating current, and
a drive signal generator that generates, based on the output voltage command value, a drive signal usable to drive the switching elements by a two-phase modulation method,
the current compensation unit inverter supplying, by switching operation of the switching elements, the compensating current to the alternating-current power source via the current compensation unit reactor, $Lac \leq 16/Pmax$, and $Td \leq (45.23/fsw - 0.135)$, where fsw represents a carrier frequency employed for generation of the drive signal,
Pmax represents a maximum input power of the power conversion unit,
Td represents a dead time for the drive signal, and
Lac represents an inductance of the current compensation unit reactor when the current flowing in the current compensation unit reactor is 0 A.

17. The power converter according to claim 16, wherein a ratio of
an inductance of the current compensation unit reactor when the current flowing in the current compensation unit reactor is at a peak current to
an inductance of the current compensation unit reactor when the current flowing in the current compensation unit reactor is 0 A
is set to ⅓ or more.

18. The power converter according to claim 16, comprising:
a filter interposed between the alternating-current power source and the current compensation unit reactor, the filter including
a filter reactor with a smaller inductance than the current compensation unit reactor, and
a filter capacitor, the filter having a resonance frequency of 4 kHz or higher.

19. The power converter according to claim 16, wherein the drive signal generator generates the drive signal based on the output voltage command value such that a percentage of an amplitude of an alternating-current-side line voltage with respect to a direct-current voltage between the direct-current-side nodes of the current compensation unit inverter is 70% or more.

20. The power converter according to claim 16, wherein the compensation controller includes a voltage command value calculation unit that calculates the output voltage command value based on the direct-current voltage between the direct-current-side nodes of the current compensation unit inverter and on a direct-current voltage command value, and a direct-current voltage command value calculation unit calculates the direct-current voltage command value based on the output voltage command value such that the direct-current voltage command value is equal to or less than the double of an average alternating-current-side line voltage of the current compensation unit inverter or of a fundamental frequency component of the alternating-current-side line voltage of the current compensation unit inverter.

* * * * *